(12) United States Patent
Matsuzawa et al.

(10) Patent No.: US 10,969,025 B2
(45) Date of Patent: Apr. 6, 2021

(54) DIAPHRAGM MEMBER AND DIAPHRAGM VALVE PROVIDED WITH DIAPHRAGM MEMBER

(71) Applicant: ADVANCE DENKI KOGYO KABUSHIKI KAISHA, Kasugai (JP)

(72) Inventors: Hironori Matsuzawa, Kasugai (JP); Nobuyuki Fujikawa, Kasugai (JP)

(73) Assignee: ADVANCE DENKI KOGYO KABUSHIKI KAISHA, Kasugai (JP)

( * ) Notice: Subject to any disclaimer, the term of this patent is extended or adjusted under 35 U.S.C. 154(b) by 51 days.

(21) Appl. No.: 16/519,825

(22) Filed: Jul. 23, 2019

(65) Prior Publication Data
US 2020/0049260 A1 Feb. 13, 2020

(30) Foreign Application Priority Data
Aug. 10, 2018 (JP) .............................. JP2018-151861

(51) Int. Cl.
| F16K 7/12 | (2006.01) |
| F16K 7/17 | (2006.01) |
| G05D 7/01 | (2006.01) |
| F16K 51/02 | (2006.01) |
| B29C 65/16 | (2006.01) |
| F16J 3/02 | (2006.01) |
| F16J 15/06 | (2006.01) |

(52) U.S. Cl.
CPC ................ *F16K 7/123* (2013.01); *F16K 7/12* (2013.01); *F16K 7/126* (2013.01); *F16K 7/17* (2013.01); *F16K 51/02* (2013.01); *G05D 7/012* (2013.01); *B29C 65/1635* (2013.01); *F16J 3/02* (2013.01); *F16J 15/06* (2013.01)

(58) Field of Classification Search
CPC ... F16K 7/12; F16K 7/17; F16K 7/126; F16K 7/123
See application file for complete search history.

(56) References Cited

U.S. PATENT DOCUMENTS

| 5,743,169 | A * | 4/1998 | Yamada ............ B29C 45/14467 92/100 |
| 6,192,932 | B1* | 2/2001 | Izumo ..................... F16K 11/20 137/606 |
| 10,260,649 | B2* | 4/2019 | Inoue ...................... F16K 11/20 |
| 2003/0155546 | A1* | 8/2003 | Browne ................... F16K 7/12 251/331 |
| 2007/0120086 | A1* | 5/2007 | Yoshino .................... F16K 7/16 251/331 |
| 2012/0119129 | A1* | 5/2012 | Sakai .................. F16K 31/1225 251/321 |
| 2020/0072384 | A1* | 3/2020 | Chien ................... F16K 49/005 |

FOREIGN PATENT DOCUMENTS

JP 5286330 B2 9/2013

* cited by examiner

Primary Examiner — Umashankar Venkatesan
(74) Attorney, Agent, or Firm — Oliff PLC

(57) ABSTRACT

A diaphragm member includes a film-shaped diaphragm made of PFA and a valve body which is laser welded to a central hole portion of the diaphragm.

21 Claims, 11 Drawing Sheets

DIAPHRAGM MEMBER AND DIAPHRAGM VALVE PROVIDED WITH DIAPHRAGM MEMBER

BACKGROUND OF THE INVENTION

Field of the Invention

The present invention relates to a diaphragm member suitable for use in a diaphragm valve which causes a liquid such as a high-purity chemical liquid or ultrapure water to flow in a semiconductor manufacturing apparatus, and a diaphragm valve provided or equipped with the diaphragm member.

Description of the Related Art

Conventionally, a diaphragm valve of this type includes a housing, a diaphragm supported axially displaceably in a curved shape in the housing, and a driving mechanism assembled in the housing to drive the diaphragm so as to axially displace the diaphragm in the curved shape.

In case the diaphragm valve having the structure described above is used in a semiconductor manufacturing apparatus, it is desirable to use fluorine resin excellent in chemical resistance such as acid resistance, alkali resistance or the like, as a forming material of the diaphragm in the diaphragm valve. This is because highly corrosive chemical liquids such as strong acids, strong alkalis or the like are used as high-purity chemical liquids in a washing process and/or a peeling process in the semiconductor manufacturing apparatus.

Moreover, as the forming material of the diaphragm, it is desirable to use fluorine resin having low elution property, since elution of metal components and/or organic components from the diaphragm valve is not permitted in the semiconductor manufacturing apparatus.

In view of the structure of the diaphragm valve described above, it is desirable to use fluorine resin which is excellent in flexibility and capable of maintaining long life.

From the above-descriptions, as the forming material of the diaphragm, it is required to use fluorine resin which has chemical resistance and low elution property, and is also excellent in flexibility, and capable of maintaining long life.

By the way, in the diaphragm valve having the structure described above, it is not permitted that a liquid is contaminated by particles from the diaphragm valve in the semiconductor manufacturing apparatus. Thus, it is necessary that a liquid flowing in a flow path system of the diaphragm valve is isolated by the diaphragm from the driving mechanism. For such isolation, it is required that the diaphragm is formed integrally by an outer peripheral portion, a curved displacement portion, and a central portion.

Herein, in case PTFE is used as a forming material of the diaphragm, it is impossible to form a diaphragm with high quality by injection molding or extrusion molding, because PTFE is low in its melt flow rate. Consequently, the diaphragm is formed by cutting a compression molded round bar of PTFE.

Although the diaphragm of PTFE formed by cutting in this way has long life, a curved displacement portion, which is formed by cutting, in the diaphragm valve with such a diaphragm extends or compresses at its surface according to operation of the diaphragm valve. As a result, a small amount of dust is generated from the curved displacement portion. However, such dust generation is maintained within an allowable range in case the wiring pitch of a silicon wafer manufactured in a semiconductor manufacturing apparatus is, for example, larger than 10 (nm).

In case PFA is used in replacement of PTFE as the forming material of the diaphragm, the diaphragm is formed by cutting an injection molded round bar, a compression molded round bar, or an extrusion molded round bar.

The diaphragm of PFA formed by cutting in this way has short life. Moreover, a diaphragm valve with the diaphragm of PFA formed by cutting as described above is extended or compressed at a surface of a curved displacement portion thereof similar to the curved displacement portion of the diaphragm of PTFE formed by cutting. Thus, a small amount of dust is generated from the curved displacement portion.

Herein, in case PFA is used as the forming material of a diaphragm and the diaphragm is formed by molding a thick curved displacement portion by injection molding with PFA and then cutting the same, crystallization of the curved displacement portion is not uniformly caused. Accordingly, the interface of the curved displacement portion becomes a starting point of destruction and life of the curved displacement portion becomes short. Consequently, the diaphragm having such a curved displacement portion is hardly used.

Meanwhile, in recent years, further refinement or miniaturization is demanded for manufacturing semiconductor elements, for example, silicon wafers in a semiconductor manufacturing apparatus. For example, there is a request for reducing the wiring pitch of a silicon wafer to 10 (nm) or less. Thus, dust generation from a diaphragm valve is in a situation where even dust generation of particles of a few nm in size is not permitted.

Well, in a diaphragm valve provided or equipped with diaphragm formed by cutting, as described above, a curved displacement portion formed by cutting extends or compresses at its surface during operation of the diaphragm valve. Accordingly, a small amount of dust is generated from the curved displacement portion.

In such a case, it is impossible to cope with the situation where even generation of particles of a few nm sizes from the diaphragm valve mentioned above is not permitted. Thus, further improvement is requested to the diaphragm having the curved displacement portion formed by cutting.

In contrast to the request, a film of PFA is thin. It is, therefore, possible to make crystallization of the film uniform. Accordingly, it is recognized that if the film of PFA is formed by extrusion molding or compression molding and is adopted as a diaphragm having a curved displacement portion, this leads to the improvement of the diaphragm described above.

By the way, in the diaphragm valve described above, the diaphragm is coupled at its central portion with a driving shaft of the driving mechanism due to the construction of the diaphragm valve in displacing the diaphragm with a curved shape by the driving mechanism.

However, it is impossible that a coupling portion necessary to be coupled with the driving shaft of the driving mechanism is formed in the central portion of the diaphragm, since the diaphragm is a film and very thin as described above. It is thus very difficult to couple the central portion of the diaphragm to the driving shaft of the driving mechanism without the coupling portion.

In view of the difficulty, it is considered to utilize a construction of a diaphragm valve applying laser welding in a method of sealing a resin diaphragm described in Japanese Patent No. 5,286,330.

In the diaphragm valve described in Japanese Patent No. 5,286,330, although for sealing purposes, the diaphragm is laser welded at its flange portion to the flange portion of a lower housing so as to seal a valve chamber. Focusing such points, it came to the idea that it would be possible to utilize laser welding for coupling the central hole portion of the diaphragm of PFA with the other member.

SUMMARY OF THE INVENTION

It is therefore an object of the present invention to provide a diaphragm member which is constructed as a diaphragm construction applying laser welding to coupling with the central hole portion of the diaphragm of the valve body, even if the diaphragm is as thin as a film by selecting a film-like PFA capable of securing flexibility and long life as a forming material of a diaphragm capable of minimizing even dust generation of about a few nanometer (nm) and utilizing a valve body of an appropriate fluorine resin in consideration of ease of assembly with other members.

It is another object of the present invention to provide a diaphragm valve provided with the diaphragm member described above.

In solving the above-mentioned problems, there is provided with a diaphragm member according to the present invention including:

a film-like diaphragm of PFA applied to a diaphragm valve flowing a liquid such as a high-purity chemical liquid or ultrapure water, and a valve body of fluorine resin.

The diaphragm is formed with a central hole portion at its central portion, and the valve body is joined at its base portion by laser welding to the central hole portion of the diaphragm.

According to the construction, coupling of the central hole portion of the diaphragm and the valve body is made by laser welding. Thus, the valve body is joined and coupled preferably to the central hole portion of the diaphragm.

Furthermore, the diaphragm is formed with PFA as a film-like diaphragm. Consequently, even if the diaphragm is in the form of film, it can be formed as a diaphragm which is excellent in chemical resistance, low elution, flexibility and long life and is also capable of minimizing generation of dust.

Further, although the film-like diaphragm described above is very thin, it is joined at its central hole portion to the valve body by laser welding. Thus, even if the diaphragm does not include at its central portion a coupling portion necessary for coupling with other members, it is possible to perform easily coupling between the diaphragm and other members by coupling the base portion of the valve body to the other members through the central hole portion of the diaphragm.

Still further, even if the diaphragm is joined to the valve body at the central hole portion, the valve body can be positioned as a free component regardless of the driving mechanism except for the relationship with the diaphragm. Thus, after the diaphragm is joined to the valve body, the diaphragm constructs a diaphragm member together with the valve body. This can secure convenience that the diaphragm can be applied to diaphragm valves with various structures.

Furthermore, in the diaphragm member according to the above-mentioned present invention, the central portion of the diaphragm extends in a curved shape toward one surface of two surfaces of the diaphragm so as to form a convex curved shape toward a center of the diaphragm, the central portion of the diaphragm being formed as a central curved portion including the central hole portion, and the base portion of the valve body is joined at its portion to the central hole portion by laser welding in a state that it is fitted at its portion into the central hole portion of the central curved portion.

Even if the diaphragm is constructed so as to include central curved portion including the central hole portion, operations and effects similar to the above-mentioned invention can be achieved.

Still further, the diaphragm member according to the present invention further comprises an annular body for reinforcement of fluorine resin being joined by laser welding to the one surface or the other surface of the diaphragm along an outer peripheral portion thereof.

With this construction, even if it is difficult to handle the diaphragm because the diaphragm is thin like a film, the annular body for reinforcement can preferably exhibit a reinforcing function to the diaphragm on a basis of the joining construction of the outer peripheral portion of the diaphragm and the annular body for reinforcement by laser welding. Thus, together with the operation and effects of the above-mentioned invention it is possible to achieve operations and effects that the diaphragm can be easily handled without bending, even if it is thin.

In the diaphragm member according to the present invention, the diaphragm is formed in a film shape with PFA by extrusion molding or compression molding.

In this way, the diaphragm is formed in a film shape by extrusion molding or compression molding of PFA. Consequently, it is possible to form a diaphragm which has a surface with a high degree of smoothness capable of suppressing generation of dust to a lesser extent, compared to form the diaphragm by cutting, and also of particularly suppressing even generation of dust such as particles of a few nanometers (nm) in size, and which is excellent in chemical resistance, low elution, flexibility and long life.

Further, the diaphragm is formed in a film shape by extrusion molding or compression molding of PFA, as described above. Thus, the diaphragm can be equalized in crystallization centering its central curved portion, thereby to be capable of being further extended in its life. By the above, it is possible to further improve operation and effects of the above mentioned present invention.

In the diaphragm member according to the present invention, the diaphragm has a thickness within a range from 0.1 (mm) or more to 0.5 (mm) or less.

Thus, it is possible to more reliably achieve the operation and effects of the above mentioned present invention. Herein, the reason for setting the thickness of the diaphragm to 0.1 (mm) or more is because the diaphragm is too thin and easily broken, if the thickness is less than 0.1 (mm). On the other hand, the reason for setting the thickness of the diaphragm to 0.5 (mm) or less is because the diaphragm is too thick and hard to bend, if the thickness is thicker than 0.5 (mm).

Still further, there is provided with a diaphragm valve according to the present invention which flows a liquid such as a high-purity chemical liquid, an ultrapure water or the like from an inflow side to an outflow side when opened at a valve portion thereof and blocking the flowing of the liquid when closed at the valve portion thereof.

The diaphragm valve comprises:

a housing including a cylindrical peripheral wall and both opposing walls formed opposite to each other on the cylindrical peripheral wall so as to close axial opening end portions of the cylindrical peripheral wall, a partition wall provided on an axial intermediate portion of the cylindrical peripheral wall to divide a hollow portion of the cylindrical peripheral wall between one opposing wall of the both opposing walls and the other opposing wall, a driving unit assembled in the hollow portion of the cylindrical peripheral wall between the one opposing wall and the partition wall, and a diaphragm member including a film-like diaphragm of PFA and a valve body of fluorine resin.

In the diaphragm member, the film-like diaphragm is formed with a central hole portion at its central portion, the film-like diaphragm being provided so as to form a liquid chamber between the other opposing wall in the housing and an air chamber between the partition wall in the housing, thereby to divide the interior of the housing.

The valve body is joined at its base portion by laser welding to the central hole portion of the diaphragm from a lower surface side of the diaphragm, the valve body extending from the central hole portion into the liquid chamber.

The housing is provided with an annular valve seat, an inflow path and an outflow path in the other opposing wall, the annular valve seat opposing the valve body in the liquid chamber to construct the valve portion with the valve body, the inflow path flowing the liquid from the inflow side into the liquid chamber through the annular valve seat, and the outflow path flowing the liquid in the liquid chamber to the outflow side.

The driving unit is provided integrally with a driving shaft coupled with the base portion of the valve body through the central hole portion of the diaphragm from an upper surface side of the diaphragm so as to be axially movable with the valve body of the diaphragm member toward the annular valve seat or in the opposite direction.

The diaphragm member closes the valve portion when the valve body is seated on the annular valve seat while displacing the diaphragm in a curved shape in conjunction with the axial movement of the driving shaft to the side of the other opposite wall, the diaphragm member opening the valve portion when the valve body is separated from the annular valve seat while displacing the diaphragm in a curved shape in conjunction with the axial movement of the driving shaft to the side of the one opposite wall.

As described above, the diaphragm member is constructed by both of the diaphragm of PFA and the valve body of fluorine resin which is laser welded coaxially to the central hole portion of the diaphragm to extend from the central hole portion. Accordingly, the diaphragm member is coupled at its valve body to the driving shaft of the driving mechanism through the central hole portion of the diaphragm.

Herein, even if the diaphragm is thin and hard to be handled, the central hole portion of the diaphragm is laser welded to the valve body, as described above. Accordingly, the driving shaft, the diaphragm, and the valve body are easily coupled to each other by coupling the driving shaft to the valve body through the central hole portion of the diaphragm.

According to the construction described above, the diaphragm valve closes the valve portion, when the diaphragm member is seated at its valve body on the annular valve seat while displacing the diaphragm in a curved shape in conjunction with the axial movement of the valve body toward the other opposing wall of the driving shaft. The diaphragm valve opens the valve portion, when the diaphragm member is separated at its valve body from the annular valve seat while displacing the diaphragm in a curved shape in conjunction with the axial movement of the valve body toward the one opposing wall of the driving shaft.

Thus, it is needless to say to be capable of achieving operations and effects similar to those of the invention mentioned above. And, it is possible to provide the diaphragm valve capable of achieving operations and effects of easily coupling the driving shaft, the diaphragm, and the valve body to each other as described above.

In the diaphragm valve according to the present invention, the central portion of the diaphragm is extended in a curved shape toward the lower surface of the diaphragm so as to have a convex curved shape toward a center of the diaphragm, thereby to be formed as a central curved portion including the central hole portion, the base portion of the valve body is joined at its portion with the central hole portion by laser welding in a condition that it is fitted into the central hole portion of the central curved portion of the diaphragm from the side of the lower surface of the diaphragm, and the driving unit is coupled at the driving shaft to the base portion of the valve body from the side of the upper surface of the diaphragm through the central hole portion of the central curved portion of the diaphragm.

With such a configuration, it is possible to achieve operations and effects similar to those of the above-mentioned present invention.

In the diaphragm valve according to the present invention, the driving unit includes:

a piston fitted axially slidably into the hollow portion of the cylindrical peripheral wall between the one opposing wall and the partition wall to divide the hollow portion of the cylindrical peripheral wall so as to form one side room and the other side room at the side of the one opposing wall and the partition wall, and a biasing unit for biasing the piston toward either one of the other side chamber and the one side chamber.

The driving shaft is a piston shaft which is integrally extended from the piston through the other side chamber to be coupled to the base portion of the valve body through the central hole portion of the diaphragm.

According to such a construction, when the piston is biased and slided by the biasing unit toward either one of the other side chamber and the one side chamber, the valve body is seated on the annular valve seat while the piston shaft interlocks with the piston to displace the diaphragm in a curved shape. Or, when the piston shaft is slided against the biasing unit by supply of an airflow to any other chamber, the valve body is separated from the annular valve seat while the piston shaft interlocks with the piston to displace the diaphragm in a curved shape. This means that the diaphragm valve functions as an air operated diaphragm valve.

Even such an air operated diaphragm valve, it is possible to achieve operations and effects similar to those of the invention described above.

In the diaphragm valve according to the present invention, the driving unit includes:

a solenoid fitted axially into the hollow portion of the cylindrical peripheral wall between the one opposing wall and the partition wall, a plunger inserted axially movably in the solenoid as the driving shaft to extend toward the partition wall, and a biasing unit for biasing the plunger toward the partition wall or in the opposite direction.

The plunger is coupled at its extending end portion to the base portion of the valve body through the central hole portion of the diaphragm from the side of the upper surface of the diaphragm.

According to such a construction, in the diaphragm valve, when the plunger is biased and slided by the biasing unit toward the partition wall or in the opposite direction, the valve body interlocks with the plunger to sit the annular valve seat while it interlocks with the plunger to displace the diaphragm in a curved shape. Or, when the plunger is slid against the biasing unit on a basis of magnetic attraction force of the solenoid in the direction opposite to the biasing direction by the biasing unit, the valve body interlocks with the plunger to separate from the annular valve seat while it interlocks with the plunger to displace the diaphragm in a curved shape. This means that the diaphragm valve functions as an electromagnetically operated valve.

Even such an electromagnetically operated valve, it is possible to achieve operations and effects similar to those of the invention described above.

In the diaphragm valve according to the present invention, the diaphragm member further includes an annular body for reinforcement of fluorine resin joined by laser welding to the lower surface or the upper surface of the diaphragm along an outer peripheral portion of the diaphragm.

It is thus possible to provide the diaphragm valve capable of achieving operations and effects similar to those of the present invention.

In the diaphragm valve according to the present invention, the diaphragm member is formed at its diaphragm in a film shape by extrusion molding or compression molding of PFA.

It is thus possible to provide the diaphragm valve capable of achieving operations and effects similar to those of the present invention.

In the diaphragm valve according to the present invention, the diaphragm of the diaphragm member has a thickness within a range from 0.1 (mm) or more to 0.5 (mm) or less.

It is thus possible to provide the diaphragm valve capable of achieving operations and effects similar to those of the present invention.

BRIEF DESCRIPTION OF THE DRAWINGS

Other features and advantages of the invention will be apparent from the following description taken in connection with the accompanying drawings.

DETAILED DESCRIPTION OF THE PREFERRED EMBODIMENTS

Hereinafter, each embodiment of the present invention will be described below, referring to the attached drawings.

First Embodiment

Figure 1:
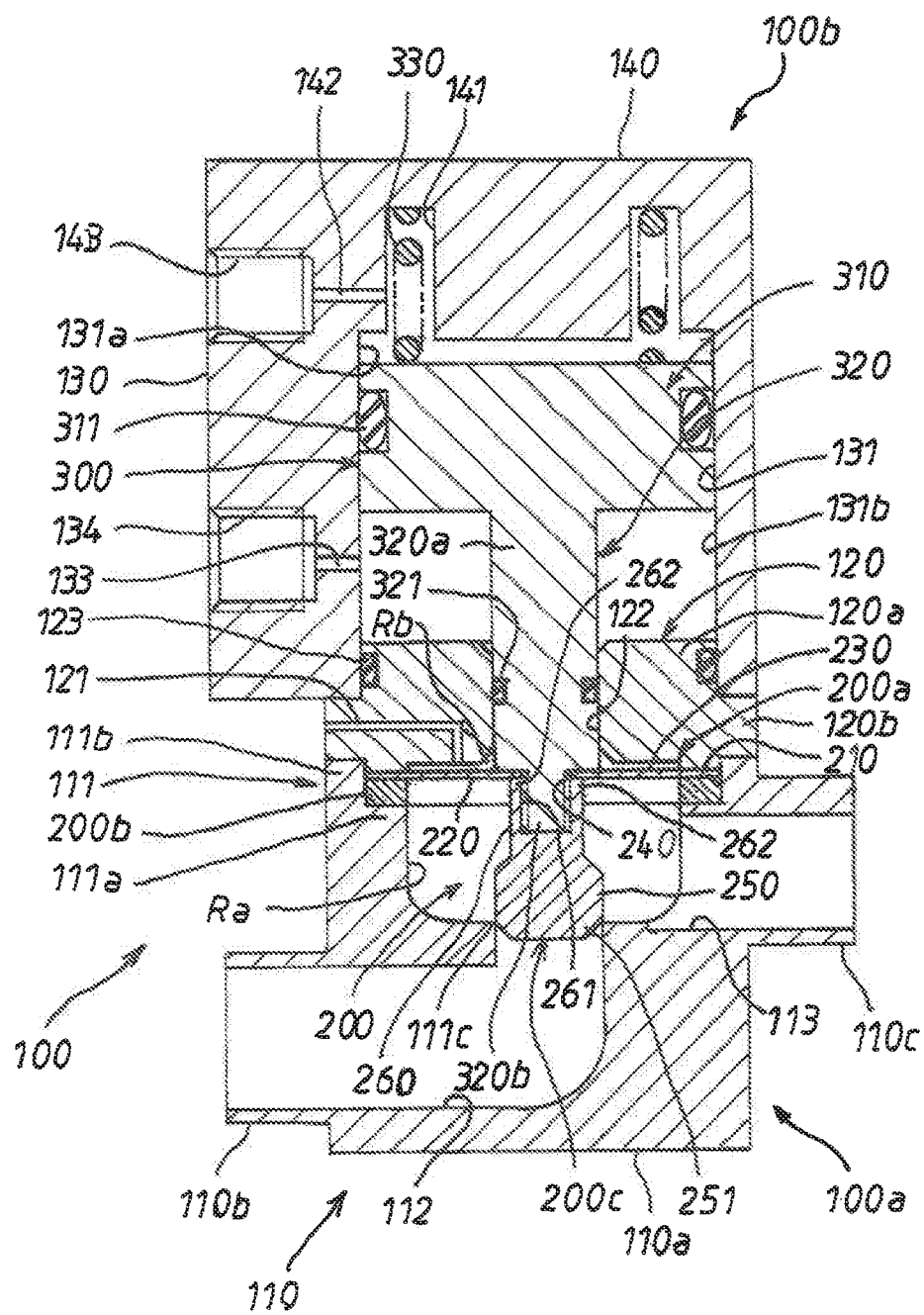
FIG. 1 indicates a longitudinal sectional view of a first embodiment of a diaphragm valve to which the present invention is applied.

FIG. 1 illustrates a first embodiment of a diaphragm valve to which the present invention is applied. As the diaphragm valve, an air operated diaphragm valve applied to a semiconductor manufacturing apparatus for manufacturing semiconductor elements is adopted.

The diaphragm valve is interposed in a piping system of the semiconductor manufacturing apparatus, and is configured or constructed to flow a liquid flowing in the piping system from an upstream side to a downstream side of the piping system. In the first embodiment, the liquid is a liquid such as a high-purity chemical solution or liquid, ultrapure water or the like. The liquid is supplied from a liquid supply source to the piping system in the semiconductor manufacturing apparatus. The liquid is required to be clean from the nature as the semiconductor manufacturing apparatus.

As illustrated in FIG. 1, the diaphragm valve includes a cylindrical housing 100, a diaphragm member 200 assembled to the cylindrical housing 100, and an air operated driving mechanism 300, thereby to be constructed as a diaphragm valve of a normally closing type. Additionally, in the first embodiment, the air operated driving mechanism 300 is hereinafter also referred to as a driving mechanism 300.

The cylindrical housing 100 is constructed by a lower housing member 100a and an upper housing member 100b.

As illustrated in FIG. 1, the lower housing member 100a includes a bottom wall 110 and a partition wall 120. The bottom wall 110 is constructed by a bottom wall main body 110a, an inflow pipe 110b, and an outflow pipe 110c.

The bottom wall main body 110a is formed in the form of a rectangular transverse section, and includes an upper wall portion 111, as illustrated in FIG. 1.

Herein, the upper wall portion 111 is constructed by an inner annular wall portion 111a and an outer annular wall portion 111b. The inner annular wall portion 111a is formed on a center side of the upper wall portion 111. The outer annular wall portion 111b is formed so as to project annularly upward than the inner annular wall portion 111a at an outer peripheral side of the inner annular wall portion 111a.

The bottom wall main body 110a includes also an annular valve seat 111c. The annular valve seat 111c is formed so as to coaxially project annularly toward the partition wall 120 at a bottom surface central hole portion of a space which is formed in a cylindrical shape with a longitudinal cross section, which narrows, as shown in FIG. 1, downward from an inner peripheral surface of the inner annular wall portion 111a in the bottom wall main body 110a. The space is hereinafter also referred to as a space of the cylindrical shape with a longitudinal cross section. Herein, the annular valve seat 111c is formed so as to communicate with an inner end opening portion of an inflow path portion 112 (to be described later).

The bottom wall main body 110a includes the inflow path portion 112 and an outflow path portion 113. The inflow path portion 112 is formed so as to extend from the annular valve seat 111c to the inflow pipe 110b in the bottom wall main body 110a. The inflow path portion 112 is communicated at its inner end opening portion with the inside of the annular valve seat 111c.

Meanwhile, the outflow path portion 113 is formed so as to extend from a portion of the inner annular wall portion 111a to the outflow pipe 110c in the bottom wall main body 110a. Herein, the outflow path portion 113 is formed at its inner end opening portion so as to open to a liquid chamber Ra (to be described later) from a portion of the inner annular wall portion 111a in the bottom wall main body 110a.

The inflow pipe 110b is formed to the bottom wall main body 110a so as to extend externally from an outer end opening portion of the inflow path portion 112. The inflow pipe 110b plays a role for causing the inflow path portion 112 to communicate with the upstream side of the piping system. On the other hand, the outflow pipe 110c acts a role for causing the outflow path portion 113 to communicate with the downstream side of the piping system.

As illustrated in FIG. 1, the partition wall 120 includes a partition wall main body 120a and an annular flange 120b. The partition wall main body 120a is fitted at its lower wall portion into the outer annular wall portion 111b of the upper wall portion 111 in the bottom wall main body 110a and sits on the inner annular wall portion 111a through a diaphragm 200a of the diaphragm member 200 and an annular body 200b for reinforcement (to be described later).

The annular flange 120b is formed so as to annularly project outward from an axially intermediate portion of the bottom wall main body 110a in a radial direction. The annular flange 120b sits coaxially on the outer annular wall portion 111b of the upper wall portion 111 of the bottom wall main body 110a. In this way, the partition wall 120 is assembled coaxially to the bottom wall main body 110a from above through the diaphragm 200a and the annular body 200b for reinforcement.

The partition wall 120 includes a communicating path 121. As illustrated in FIG. 1, the communicating path 121 is formed in the form of an L-shape in the partition wall main body 120a. Herein, the communicating path 121 is open at its outer end opening portion to the outside of the partition wall 120. An inner end opening portion of the communicating path 121 is open to an air chamber Rb (to be described later) formed between the diaphragm 200a and the partition wall main body 120a.

The upper housing member 100b is formed in the form of a rectangular cross section. The upper housing member 100b is constructed by a peripheral wall 130 and an upper wall 140. The peripheral wall 130 is extended cylindrically downward from the upper wall 140. A hollow portion 131 of the peripheral wall 130 is formed at its inner peripheral surface in a circular shape as seen in transverse sectional view. The peripheral wall 130 is coaxially and air-tightly fitted at its extending end opening portion into the partition wall main body 120a of the partition wall 120 from above through an O-ring 123 to sit on the annular flange 120b.

As illustrated in FIG. 1, the diaphragm member 200 is constructed by the diaphragm 200a, the annular body 200b for reinforcement, and a valve body 200c. The diaphragm 200a is sandwiched at its outer peripheral portion 210 between the bottom wall main body 110a of the bottom wall 110 and the partition wall main body 120a of the partition wall 120 through the annular body 200b for reinforcement. Accordingly, in the diaphragm 200a, a space area ranging to the lower surface of the partition wall from the inner circumferential surface of the above mentioned space of the cylindrical shape with the longitudinal cross section is divided into a liquid chamber Ra and an air chamber Rb at the inner peripheral side of the outer annular wall portion 111b of the upper wall portion 111.

Herein, a liquid which flows from the upstream side of the piping system of the semiconductor manufacturing apparatus through the inflow pipe 110b and the inflow path portion 112 of the bottom wall 110 flows into the liquid chamber Ra through the annular valve seat 111c. Thus, the liquid generates a liquid pressure acting on a lower surface 220 of the diaphragm 200a in the liquid chamber Ra. Meanwhile, outside air flows into the air chamber Rb through the communicating path 121 of the partition wall 120. Thus, the outside air generates an air pressure (an atmospheric pressure) acting on an upper surface 230 of the diaphragm 200a in the air chamber Rb.

The diaphragm 200a is formed as a disk-like and film-like diaphragm by predetermined fluorine resin.

In the first embodiment, it is desirable that the diaphragm 200a is excellent in chemical resistance such as acid resistance, alkali resistance and the like, because it contacts high-purity chemical solutions such as highly corrosive chemical liquids of strong acids, strong alkalis or the like, based on the construction as a diaphragm valve.

It is also desirable to use fluorine resin having at least low elution as a forming material of the diaphragm, because it is not permitted to elute metal components and/or organic components from the diaphragm 200a of the diaphragm valve and/or other constituent members.

It is further desirable that the diaphragm 200a is excellent at least in flexibility and long life, because it repeats curved displacement every time it opens and closes.

Then, in the first embodiment, tetrafluoroethylene-perfluoroalkyl vinyl ether copolymer (PFA) which is excellent in chemical resistance, low elution, thermal resistance, and corrosion resistance, and capable of securing flexibility and long life is adopted as the above mentioned predetermined fluorine resin. In addition, in the first embodiment, PFA is also used as each of materials for forming the cylindrical housing 100 and the partition wall 120.

The diaphragm 200a is formed by PFA to have a thickness within a predetermined thickness range, for example, a thickness of 0.5 (mm) as a film-like diaphragm. In the first embodiment, the predetermined thickness range is from 0.1 (mm) or more to 0.5 (mm) or less.

Herein, the reason why the predetermined thickness range is 0.1 (mm) or more is based on the fact that if it is less than 1 (mm), the diaphragm is too thin and thus is easily broken. Meanwhile, the reason why the predetermined thickness range is 0.5 (mm) or less is based on the fact that if the diaphragm 200a is thicker than 0.5 (mm), it is too thick to be bent.

The annular body 200b for reinforcement is used to reinforce the film-shaped diaphragm 200a. The annular body 200b for reinforcement is joined by laser welding along the outer peripheral portion 210 of the diaphragm 200a from a side of the lower surface 220 of the diaphragm 200a. Accordingly, the annular body 200b for reinforcement is formed integrally with the outer peripheral portion 210 of the diaphragm 200a.

In the first embodiment, the annular body 200b for reinforcement is formed by injection molding PFA into a cylindrical shape and then cutting the molded PFA into an annular shape, as described later. Herein, the annular body 200b for reinforcement has an outer diameter equal to the outer diameter of the diaphragm 200a. Axial width and thickness of the annular body 200b for reinforcement are predetermined respectively to values suitable for reinforcing the film-shaped diaphragm 200a and easily handling it.

The valve body 200c constructs a valve portion of the diaphragm valve together with the annular valve seat 111c. The valve body 200c is formed by injection molding PFA so as to integrally have a head portion 250 and a neck portion 260. The neck portion 260 acts a role as a base portion of the valve body 200c coupled to a piston shaft 320, as described later.

The head portion 250 is cylindrical and is cut at its axial distal end portion in an inclined manner along its peripheral portion, thereby to be as a seat portion 251. The neck portion 260 is formed so as to coaxially extend from an end portion opposite to the seat portion 251 of the head portion 250. The neck portion 260 includes a female screw hole portion 261 which is formed in the form of female screw hole in the neck portion 260 from its extending end portion 262. Thus, the female screw hole portion 261 constructs the extending end portion 262 of the neck portion 260 at its open end portion. Hereinafter, the extending end portion 262 is also referred to as an open end portion 262.

In the valve body 200c constructed in this way, the neck portion 260 is joined at the open end portion 262 by laser welding to a central hole portion 240 formed in the center portion of the diaphragm 200a. In the female screw hole portion 261 of the neck portion 260, a shaft-shaped male screw portion 320b of the piston shaft 320 is fastened through the central hole portion 240 of the diaphragm 200a, as described later. Accordingly, the head portion 250 opposes at its seat portion 251 the annular valve seat 111c coaxially and seatably. This means that the valve body 200c opposes seatably the annular valve seat 111c and constructs the valve portion of the diaphragm valve together with the annular valve seat 111c.

The diaphragm member 200 constructed above is integrally formed by the diaphragm 200a, the annular body 200b for reinforcement, and the valve body 200c. When the valve body 200c is pressed toward the liquid chamber Ra by the piston shaft 320 under urging or biasing force of a coil spring 330 as described later, it closes the valve portion based on the fact that the diaphragm 200a is seated on the annular valve seat 111c at the seating portion 251 while being curvedly displaced toward the annular valve seat 111c at its curved displacement portion. This means that the diaphragm valve is closed. In addition, the curved displacement portion of the diaphragm 200a is a film-like portion between the outer peripheral portion and the central portion of the diaphragm 200a.

On the other hand, when the valve body 200c is separated from the annular valve seat 111c at the seating portion 251 while displacing the diaphragm 200a in a curved shape toward the partition wall 120 in conjunction with the piston shaft 320 which slides against the urging force of the coil spring 330 according to the air pressure in the lower chamber 131b, as described later, it opens the valve portion. This means that the diaphragm valve is opened.

As illustrated in FIG. 1, the driving mechanism 300 is assembled in the housing 100. The driving mechanism 300 is constructed by a piston 310, the piston shaft 320, and the coil spring 330.

The piston 310 is fitted air-tightly and slidably into the hollow portion 131 of the peripheral wall 130 of the housing member 100b through an O-ring 311. The piston 310 divides at its axial both sides the hollow portion 131 of the peripheral wall 130 into an upper chamber 131a and a lower chamber 131b. In the first embodiment, the piston 310 is formed with the piston shaft 320 by PFA.

Herein, the upper chamber 131a is open to the outside of the housing member 100b through an annular trench portion 141, a communicating path portion 142, and an opening portion 143 formed in the upper wall 140 of the housing member 100b.

In addition, the annular trench portion 141 is annularly formed coaxially to the upper wall 140 from inside the upper chamber 131a. The opening portion 143 is formed in an outer peripheral portion of the upper wall 140. The communicating path portion 142 is formed in the upper wall 140 so as to cause the annular trench portion 141 to communicate with the opening portion 143.

Meanwhile, the lower chamber 131b is connected to a compressed airflow supply source (not shown) through a communicating path portion 133 and an opening portion 134 formed in the peripheral wall 130. Accordingly, a compressed airflow from the compressed airflow supply source is supplied into the inside of the lower chamber 131b through the opening portion 134 and the communicating path portion 133.

In addition, the opening portion 134 is formed in a portion of the peripheral wall 130 below the opening portion 143 so as to communicate with the lower chamber 131b through the communicating path portion 133. The communicating path portion 133 is formed in a portion of the peripheral wall 130 so as to cause the opening portion 134 to communicate with the inside of the lower chamber 131b.

The piston shaft 320 is formed so as to extend coaxially and integrally from the piston 310. As illustrated in FIG. 1, the piston shaft 320 includes a shaft main body portion 320a and the shaft-shaped male screw portion 320b. The shaft main body portion 320a is extended coaxially from the piston 310 through the lower chamber 131b, thereby to be slidably fitted into a through-hole portion 122 in the partition wall main body 120a through an O-ring 321.

The shaft-shaped male screw portion 320b is extended coaxially and integrally from an extending end portion of the shaft main body 320a. The shaft-shaped male screw portion 320b is fastened to the female screw hole portion 261 of the neck portion 260 of the valve body 200c through the central hole portion 240 of the diaphragm 200a. Consequently, the piston shaft 320 is coaxially coupled at the shaft-shaped male screw portion 320b to the valve body 200c through the diaphragm 200a.

As illustrated in FIG. 1, the coil spring 330 is fitted into the annular trench portion 141 of the upper wall 140. The coil spring 330 is sandwiched between the bottom portion of the annular trench portion 141 and the piston 310 to urge or bias the piston 310 toward the lower chamber 131b.

In the driving mechanism 300 constructed in this way, in case an air pressure by a compressed airflow from the compressed airflow supply source is not generated in the lower chamber 131b, the piston 310 is slided toward the lower chamber 131b by the urging or biasing force of the coil spring 330. Accordingly, the piston shaft 320 pushes the valve body 200c toward the annular valve seat 111c while displacing the diaphragm 200a in a curved shape, thereby to seat the valve body 200c at its seating portion 215 on the annular valve seat 111c.

On the other hand, when the compressed airflow from the compressed airflow supply source is supplied into the lower chamber 131b through the opening portion 134 and the communicating path portion 133, the piston 310 slides toward the upper chamber 131a in accordance with the air pressure by the compressed air in the lower chamber 131b against the urging force of the coil spring 330 while discharging the air in the upper chamber 131a through the annular trench portion 141, the communicating path portion 142, and the opening portion 143 to the outside. Accordingly, the piston shaft 320 interlocks in the same direction as the sliding direction of the piston 310 to separate the valve body 200c from the annular valve seat 111c while displacing the diaphragm 200a in a curved shape.

Next, in manufacturing the diaphragm valve constructed as above, a method of laser welding between the diaphragm 200a and both of the annular body 200b for reinforcement and the valve body 200c in the diaphragm member 200 will be described.

In laser welding of the diaphragm 200a to the annular body 200b for reinforcement and the valve body 200c, the diaphragm 200a, the annular body 200b for reinforcement, and the valve body 200c are prepared as individual components. Since the diaphragm 200a is formed as an individual component in such a way, it may be formed as a diaphragm with the convenience of not being limited by the utilization.

In the first embodiment, the diaphragm 200a is prepared by molding PFA by an extrusion molding method. The extrusion molding by the extrusion molding method is performed, for example, as follows.

Pellet-like PFA prepared in advance are heated and melted by an extrusion molding machine. Then, the heated and melted PFA is press-fitted into a film-shaped cavity in a mold and is molded into a film shape while being gradually cooled. A molded piece molded in such a way is punched into a disk shape corresponding to the diaphragm 200a. Thus, the diaphragm 200a is formed as a film-like diaphragm.

As described above, in forming the diaphragm 200a, adoption of the extrusion molding method using PFA is based on the following grounds.

For example, if a diaphragm is formed by cutting a material made of PFA, cutting marks are formed on a surface of the diaphragm. Accordingly, in case the diaphragm formed by such cutting process contacts a liquid flowing in the liquid chamber Ra of a diaphragm valve, it is impossible to maintain the liquid clean, when although particles, for example, minute particles or the like with a size of several nanometers are minute, they are peeled off from the diaphragm due to cutting marks of the diaphragm and dusted and then mixed in the liquid.

This leads to poor quality of a product manufactured by a semiconductor manufacturing apparatus, for example, a silicon wafer with a wiring pitch of 10 (nm) or less. For this reason, it is necessary to reliably prevent mixing of particles into the liquid in the diaphragm valve, for example, even mixing of particles with a size of several nanometers into the liquid.

It is needless to mention that it is difficult to form a diaphragm by injection molding of PFA in a film shape, and it is also difficult to form a diaphragm excellent in flexibility and having long life, even if a film-shaped diaphragm is formed.

Therefore, in the first embodiment, the diaphragm 200a is formed in a film shape by extrusion molding method. Accordingly, the film-like diaphragm 200a extrusion molded by the extrusion molding apparatus is a diaphragm which is formed at each surface thereof so as to become very good smooth surface, so-called smooth surface of slippery, thereby to be capable of minimizing the generation of particles of several nm in size and which is also formed as a diaphragm excellent in chemical resistance, low elution property and flexibility, and having long life.

Furthermore, laser welding between the valve body 200c and the central hole portion 240 of the diaphragm 200a is performed as follows.

Figure 2:
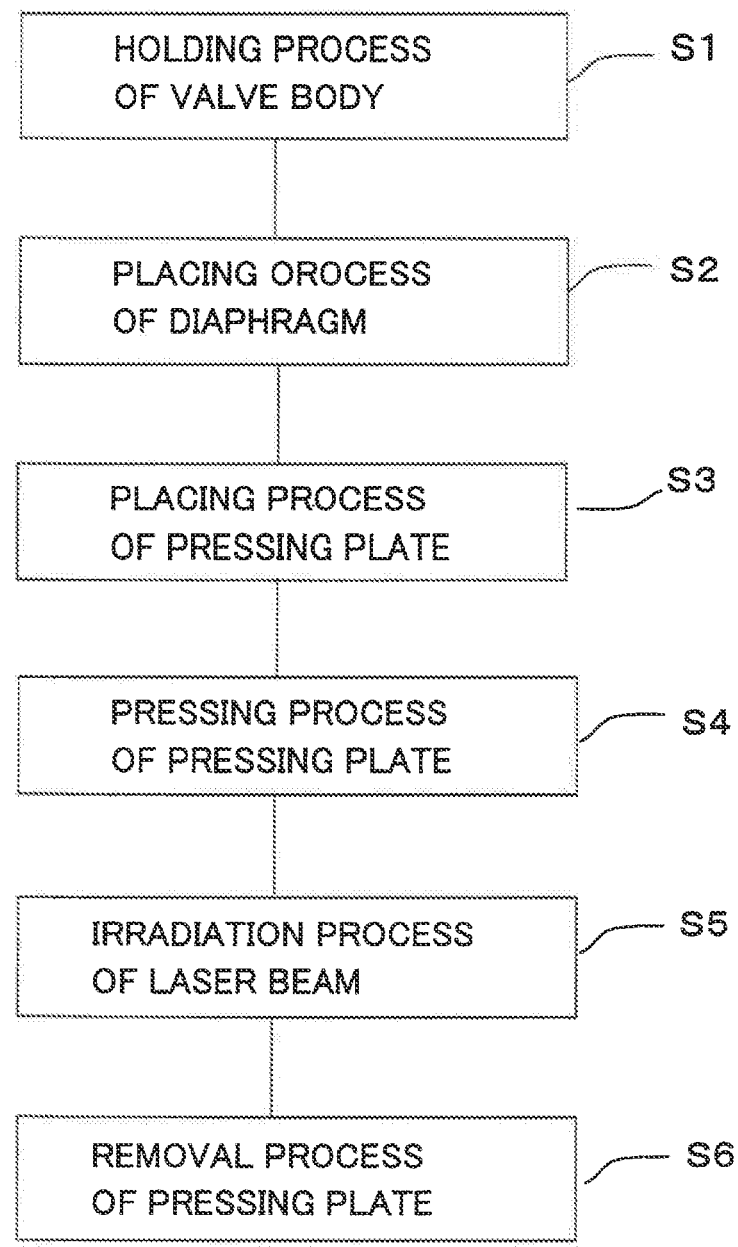
FIG. 2 indicates a process chart of laser welding a central hole portion of a diaphragm of a diaphragm member to a valve body in the first embodiment.
Figure 3:
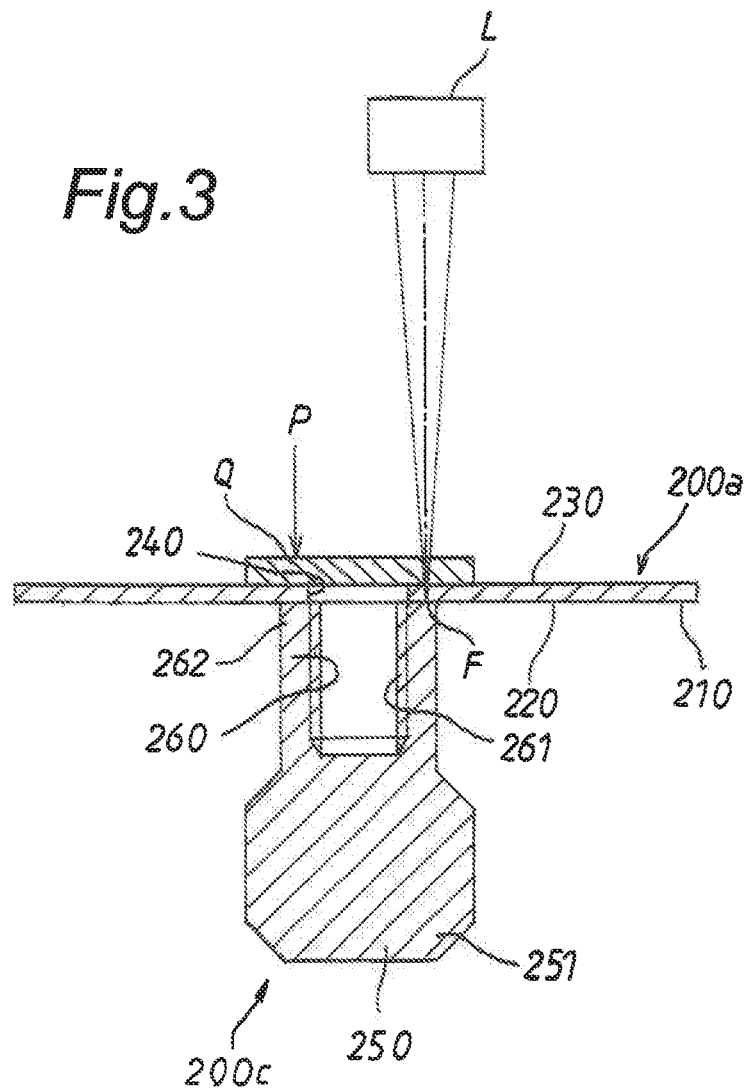
FIG. 3 indicates a sectional view for explaining laser welding of the central hole portion of the diaphragm to the valve body in the first embodiment.

Firstly, at a holding process or step S of a valve body shown in FIG. 2, the valve body 200c is held so as to open the female screw hole portion 261 upwards, as illustrated in FIG. 3. At this instance, the valve body 200c is held so as to position the female screw hole portion 261 at its axis vertically.

Thereafter, at a placing process S2 of a diaphragm, the diaphragm 200a is placed on the valve body 200c so that it is positioned at its central hole portion 240 on the female screw hole portion 261 of the neck portion 260 of the valve body 200c (see FIG. 3). In this instance, the central hole portion 240 of the diaphragm 200a is placed so as to be coaxially positioned on the open end portion 262 of the female screw hole portion 261 of the neck portion.

Next, at a placing process S3 of a pressing plate, a pressing plate Q is placed on the central hole portion 240 of the diaphragm 200a so as to coaxially oppose the open end portion 262 of the female screw hole portion 261 of the valve body 200c through the central hole portion 240.

Herein, the pressing plate Q is in a disk shape and is formed so as to have a predetermined thickness and a predetermined outer diameter with glass which easily transmits a laser beam. The glass transmitting easily the laser beam has high thermal conductivity. In addition, the pressing plate Q may be, in general, a pressing member having light transmission property and thermal conductivity. The pressing member may or may not be a plate shape and may be of any shape.

As the pressing plate Q is formed from glass transmitting easily laser beam as described above, the pressing plate Q is difficult to absorb a laser beam. As the above mentioned glass forming the pressing plate Q has high thermal conductivity, the pressing plate Q is easy to absorb heat of the central hole portion 240 of the diaphragm 200a in a placing state thereof to the central hole portion 240 of the diaphragm 200a. In addition, in the first embodiment, the outer diameter of the pressing plate Q is selected to be larger than the outer diameter of the extending end portion 262 of the neck portion 260 of the valve body 200c.

Furthermore, the predetermined thickness of the pressing plate Q is selected as follows. The predetermined thickness of the pressing plate Q is selected so that the pressing plate Q transmits the laser beam preferably and absorbs heat generated in the central hole portion 240 of the diaphragm 200a due to the laser beam, thereby to successfully suppressing temperature rise of the central hole portion 240 of the diaphragm 200a, when a laser beam is focused near an interface of the central hole portion 240 of the diaphragm 200a and the neck portion 260 of the valve body 200c through the pressing plate Q, as described later, in a state where the pressing plate Q is placed on the central hole portion 240 of the diaphragm 200a as described above.

After the pressing plate Q is placed on the central hole portion 240 of the diaphragm 200a as described above, at the next pressing process S4 of a pressing plate, the pressing plate Q is pressed from above against the central hole portion 240 of the diaphragm 200a by an appropriate pressing machine (not illustrated) as indicated by an arrow P in FIG. 3. In this instance, the pressing plate Q is pressed at its lower surface on the upper surface of the central hole portion 240 of the diaphragm 200*a* with uniform pressing force.

Under such a pressing state, at the next irradiation process S5 of a laser beam, a laser beam is irradiated from a laser device L (see FIG. 3) toward the pressing plate Q, as follows.

As to the irradiation, a description will be given of the structure of the laser device L. The laser device L is constructed so as to emit a laser beam at its emitting portion. Herein, the laser device L is constructed to focus the laser beam from the emitting portion by a lens system (not illustrated) on a focus which is spaced away from the lens system by a predetermined focal length. In addition, the laser device L is constructed so as to be capable of adjusting an emission intensity of the laser beam from the emitting portion.

Therefore, on irradiating a laser beam toward the pressing plate Q by the laser device L, the laser device L is maintained just above the central hole portion 240 of the diaphragm 200*a* so as to oppose the central hole portion 240 of the diaphragm 200*a* at its emitting portion. In the first embodiment, the focal point of a laser beam from the laser device L, that is, the focus of the lens system corresponds to near a portion F (hereinafter, also referred to as an irradiated portion F) on the interface of the central hole portion 240 of the diaphragm 200*a* and the corresponding portion of the neck portion 260 of the valve body 200*c* (hereinafter, also referred to as a central hole portion-neck portion interface) (see FIG. 3).

Herein, the laser device L rotates around the axis of the pressing plate Q while converging the laser beam on a circumference including the neighborhood of the irradiated portion F of the central hole portion-neck portion interface along the circumference.

In this instance, the height of the laser device L from the outer peripheral portion of the central hole portion 240 of the diaphragm 200*a* is adjusted so that the focus of the lens system of the laser device L is located near the irradiated portion F of the central hole portion-neck portion interface.

Further, the emission intensity of a laser beam from the laser device L is adjusted so that the central hole portion 240 of the diaphragm 200*a* and the open end portion 262 of the neck portion 260 of the valve body 200*c* are meltable in a circumferential area (a melting area) which is centered on the neighborhood of the irradiated portion F of the central hole portion-neck portion interface.

Herein, the melting point of PFA is approximately 320 (° C.). Thus, the laser device L is set at its emission intensity so that the heating temperature of the neighborhood of the irradiated portion F on the central hole portion-neck portion interface is slightly higher than the melting point of PFA.

However, considering the fact that the pressing plate Q absorbs heat of the central hole portion 240 of the diaphragm 200*a* under its high thermal conductivity, the emission intensity of a laser beam onto the neighborhood of the irradiated portion F is set as a predetermined emission intensity so that even if the heating temperature of the neighborhood of the irradiated portion F of the central hole portion-neck portion interface increases to exceed the melting point of PFA, the melting area which is centered on the neighborhood of the irradiated portion F of the central hole portion-neck portion interface is accommodated in a predetermined area.

In other words, in the laser device L, a laser beam irradiated on the melting area including the neighborhood of the irradiated portion F of the central hole portion-neck portion interface is set at its irradiation intensity so as to uniformly become the predetermined irradiation intensity. In addition, the predetermined area described above is, for example, an area which does not include at least the upper surface of the central hole portion 240 of the diaphragm 200*a*, and which does not include a portion of the neck portion 260 other than a portion including the open end portion 262 in a state where the central hole portion 240 of the diaphragm 200*a* is disposed on the neck portion 260 of the valve body 200*c*.

When the laser device L rotates to emit a laser beam toward the outer peripheral portion of the pressing plate Q as illustrated in FIG. 3, the laser beam is transmitted through the outer peripheral portion of the pressing plate Q and the central hole portion 240 of the diaphragm 200*a* in a thickness direction to be focused near the irradiated portion F which is successively displaced in a circumferential direction in the central hole portion-neck portion interface.

Then, under the above-mentioned setting of the irradiation intensity of the laser beam while such irradiation of the laser beam is maintained, the central hole portion 240 of the diaphragm 200*a* and a portion which includes the open end portion 262 of the neck portion 260 of the valve body 200*c* is successively and locally heated by the laser beam centered on the neighborhood of the irradiated portion F according to a movement position of the laser device L along a peripheral direction of the central hole portion-neck portion interface.

In the first embodiment, in a case of such local heating, the heating temperature of the central hole portion 240 of the diaphragm 200*a* gradually decreases in the central hole portion 240 of the diaphragm 200*a* from its lower surface (a surface on the side of the valve body 200*c*) to the opposite surface under heat absorption of the pressing plate Q and gradually decreases from the side of the central hole portion 240 of the diaphragm 200*a* in the direction opposite to the upper surface of the central hole portion 240 in the valve body 200*c*. Accordingly, the neck portion 260 of the valve body 200*c* and the central hole portion 240 of the diaphragm 200*a* are melted together in the predetermined area described above.

While maintaining such irradiation by laser beam, the laser device L rotates so as to successively focus a laser beam along the circumference including the neighborhood of the irradiated portion F of the central hole portion-neck interface.

Accordingly, a portion including the open end portion 262 of the neck 260 of the valve body 200*c* and the central hole portion 240 of the diaphragm 200*a* are heated by a laser beam to be uniformly melted and welded over the predetermined area which is centered on the melting area including the neighborhood of the irradiated portion F of the central hole portion-neck portion interface. Thereafter, the laser device L stops emission of the laser beam, and the portion of the neck portion 260 of the valve body 200*c* including the open end portion 262 and the central hole portion 240 of the diaphragm 200*a* are naturally cooled and hardened.

Herein, the predetermined area is the area which does not include at least the upper surface portion of the central hole portion 240 of the diaphragm 200*a* and the portion other than the portion including the open end portion 262 of the neck portion 260 of the valve body 200*c* in the state where the central hole portion 240 of the diaphragm 200*a* is disposed on the portion including the open end portion 262 of the neck portion 260 of the valve body 200*c*, as previously described. Thus, in the state where the central hole portion of the diaphragm 200*a* is disposed on the portion including the open end portion 262 of the neck portion 260 of the valve body 200c, the central hole portion 240 of the diaphragm 200a does not melt to a joint surface to the pressing plate Q, and the portion including the open end portion 262 of the neck portion 260 of the valve body 200c does not melt to the portion except the portion including the open end portion 262 of the neck portion 260. Accordingly, the valve body 200c and the diaphragm 200a are welded to each other while maintaining their original shapes.

Thereafter, at a removal process S6 of a pressing plate in FIG. 2, the pressing plate Q is removed from the central hole portion 240 of the diaphragm 200a. Thus, a coupling structure based on integral joining caused by laser welding between the neck portion 260 of the valve body 200c and the central hole portion 240 of the diaphragm 200a is formed in a state where the neck portion 260 of the valve body 200c is welded and hardened to the central hole portion 240 of the diaphragm 200a.

According to the above description, it is possible to join and couple preferably the open end portion 262 of the neck portion 260 of the valve body 200c and the central hole portion 240 of the diaphragm 200a by laser welding while securing convenience before laser welding as an individual component of the diaphragm 200a. As a result, it is possible to ensure preferably scaling between the central hole portion 240 of the diaphragm 200a and the open end portion 262 of the valve body 200c under an integral construction of the outer peripheral portion 210 and the central hole portion 240 of the diaphragm 200a and a curved displacement portion between the central hole portion 240 and the outer peripheral portion 210.

Also, laser welding between the outer peripheral portion 210 of the diaphragm 200a and the annular body 200b for reinforcement is performed as follows.

Figure 4:
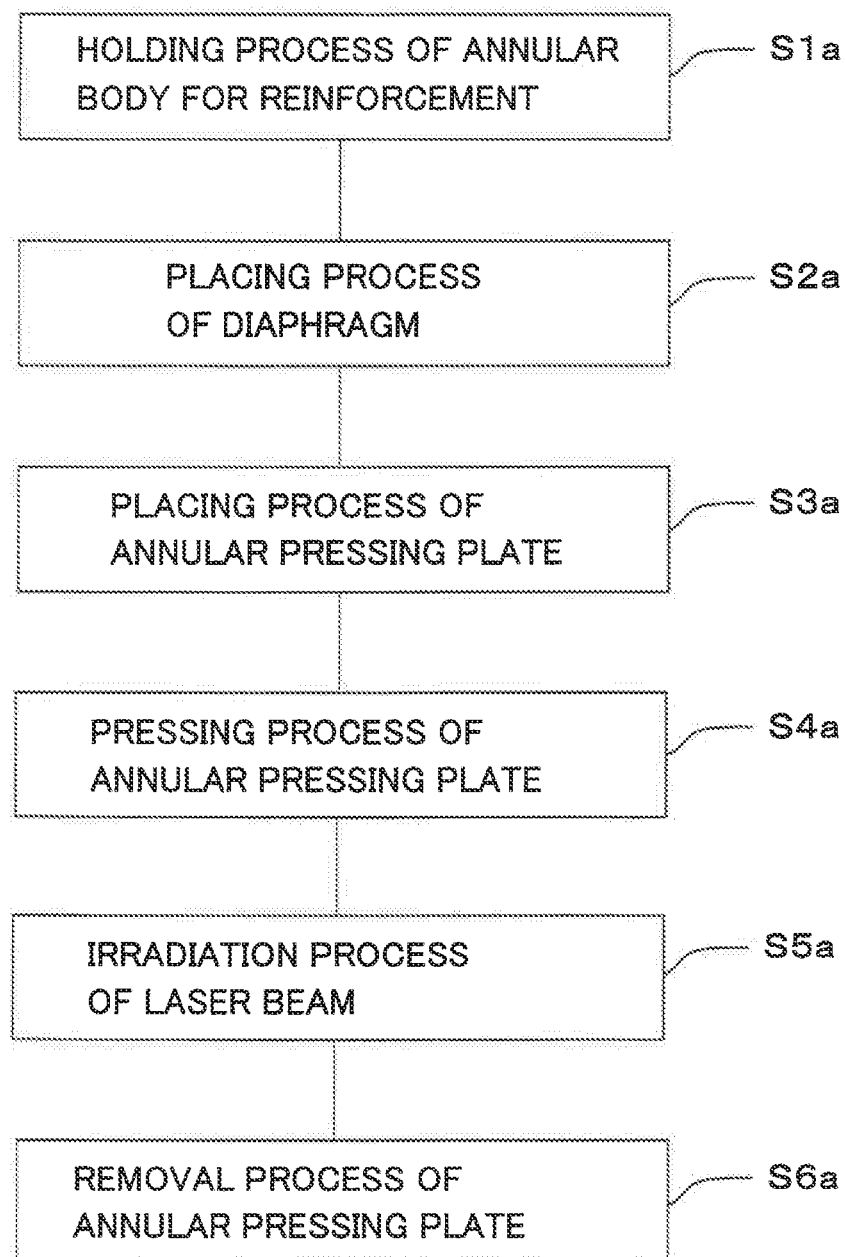
FIG. 4 indicates a process chart of laser welding an outer peripheral portion of the diaphragm of the diaphragm member to an annular body for reinforcement in the first embodiment.
Figure 5:
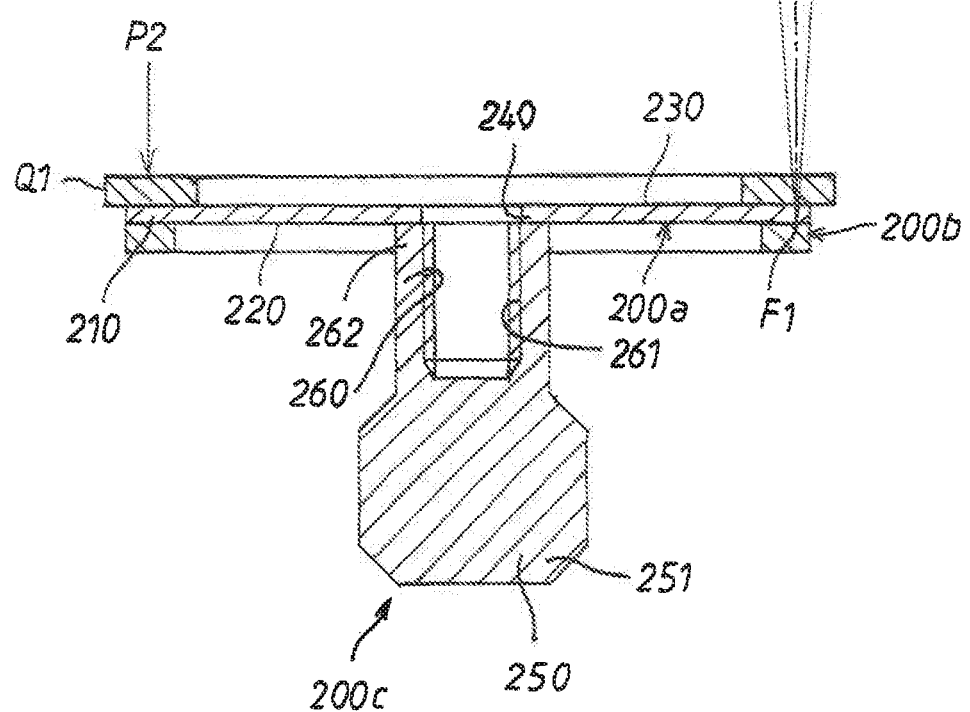
FIG. 5 indicates a sectional view for explaining laser welding of the outer peripheral portion of the diaphragm to the annular body for reinforcement in the first embodiment.

After the integrated joining structure is formed by laser welding between the open end portion 262 of the neck portion 260 of the valve body 200c and the central hole portion of the diaphragm 200a, as described above, at a holding process S1a of an annular body for reinforcement illustrated in FIG. 4, the annular body 200b for reinforcement is held at its upper surface horizontally (see FIG. 5).

Then, at a placing process S2a of a diaphragm, the diaphragm 200a is disposed at its outer peripheral portion 210 on the annular body 200b for reinforcement so as to be located on the annular body 200b for reinforcement (see FIG. 5).

Next, at a placing process S3a of an annular pressing plate, an annular pressing plate Q1 is placed on the outer peripheral portion 210 of the diaphragm 200a so as to coaxially oppose the annular body 200b for reinforcement through the outer peripheral portion 210 of the diaphragm 200a (see FIG. 5).

Herein, the annular pressing plate Q1 is formed in a ring shape with the same material as the forming material of the pressing plate Q so as to have a predetermined thickness and predetermined outer and inner diameters. Thus, the annular pressing plate Q1 has characteristics similar to the pressing plate Q, that is, has light transmission property and high thermal conductivity.

Thus, the annular pressing plate Q1 hardly absorbs a laser beam due to its light transmission property. When being placed on the outer peripheral portion 210 of the diaphragm 200a, the annular pressing plate Q1 easily absorbs heat of the outer peripheral portion 210 of the diaphragm 200a due to its high thermal conductivity.

In addition, the predetermined thickness of the annular pressing plate Q1 is selected so that the annular pressing plate Q1 successfully transmits the laser beam and absorbs heat generated in the outer peripheral portion 210 of the diaphragm 200a due to the laser beam thereby to successfully suppress temperature rise of the outer peripheral portion 210 of the diaphragm 200a when a laser beam is focused through the annular pressing plate Q1 near an interface of the outer peripheral portion 210 of the diaphragm 200a and the annular body 200b for reinforcement, as described below, in a state where the annular pressing plate Q1 is disposed on the outer peripheral portion 210 of the diaphragm 200a as described above. Also, the predetermined outer diameter of the annular pressing plate Q1 is selected to be larger than the outer diameter of the annular body 200b for reinforcement. The predetermined inner diameter of the annular pressing plate Q1 is selected to be smaller than the inner diameter of the annular body 200b for reinforcement.

After the annular pressing plate Q1 is placed on the outer peripheral portion 210 of the diaphragm 200a as described above, at the next pressing process S4a of an annular pressing plate, the annular pressing plate Q1 is pressed by an appropriate pressing machine (not shown) from above toward the outer peripheral portion 210 of the diaphragm 200a as indicated by an arrow P2 in FIG. 5. In this instance, the annular pressing plate Q1 is pressed at its lower surface on the entire upper surface of the outer peripheral portion 210 of the diaphragm 200a with uniform pressing force.

Under such a pressing state, a laser beam is irradiated from the laser device L (see FIG. 5) to the annular pressing plate Q1 at the next irradiation process S5a of a laser beam, as follows.

Herein, when a laser beam is irradiated by the laser device L toward the annular pressing plate Q1, the laser device L is maintained at its emission portion directly above the outer peripheral portion 210 of the diaphragm 200a so as to oppose the outer peripheral portion 210 of the diaphragm 200a. In the first embodiment, the focal point of a laser beam from the laser device L, namely the focus of the lens system corresponds to near a portion F1 (hereinafter, also referred to as an irradiated portion F1) on a boundary portion between the outer peripheral portion 210 of the diaphragm 200a and the corresponding annular body 200b for reinforcement (see FIG. 5). Hereinafter, the boundary portion between the outer peripheral portion 210 of the diaphragm 200a and the corresponding annular body 200b for reinforcement is also referred to as an outer peripheral portion-annular body for reinforcement boundary portion.

Also, the laser device L is adapted to rotate around the axis of the annular pressing plate Q1 while converging a laser beam on and along a circumference including the neighborhood of the irradiated portion F1 of the outer peripheral portion-annular body for reinforcement boundary portion.

In this instance, the height of the laser device L from the outer peripheral portion 210 of the diaphragm 200a is adjusted so that the focus of the lens system of the laser device L is located near the irradiated portion F1 of the outer peripheral portion-annular body for reinforcement boundary portion.

In addition, the emission intensity of a laser beam from the laser device L is adjusted so that the outer peripheral portion 210 of the diaphragm 200a and an upper surface portion of the annular body 200b for reinforcement can be melted as centering the neighborhood of the irradiated portion F1 of the outer peripheral portion-annular body for reinforcement boundary portion.

Specifically, the laser device L is set at its emission intensity so as to maintain the heating temperature of the neighborhood of the irradiated portion F1 of the outer peripheral portion-annular body for reinforcement boundary portion slightly higher than the melting point of PFA.

However, considering the fact that the pressing plate Q1 absorbs heat of the outer peripheral portion 210 of the diaphragm 200a under its high thermal conductivity, the emission intensity of a laser beam onto the neighborhood of the irradiated portion F1 is set to a predetermined emission intensity so that a melting area centering the neighborhood of the irradiated portion F1 of the outer peripheral portion-annular body for reinforcement boundary portion is accommodated in a predetermined area, as in the case of the pressing plate Q, even if the heating temperature of the neighborhood of the irradiated portion F1 of the outer peripheral portion-annular body for reinforcement boundary portion increases to exceed the melting point of PFA.

When the laser device L rotates to emit a laser beam, the laser beam is transmitted through the annular pressing plate Q1 and the outer peripheral portion 210 of the diaphragm 200a in a thickness direction to be focused near the irradiated portion F1 of the outer peripheral portion-annular body for reinforcement boundary portion which is successively displaced, as illustrated in FIG. 5.

Thus, under setting of the emission intensity of a laser beam from the laser device L, as described above, the outer peripheral portion 210 of the diaphragm 200a and the upper surface portion of the annular body 200b for reinforcement are successively and locally heated by the laser beam as centering the neighborhood of the irradiated portion F1 according to a moving position of the laser device L along the peripheral direction of the outer peripheral portion-annular body for reinforcement boundary position, while maintaining such irradiation of the laser beam. Along with this, the outer peripheral portion 210 of the diaphragm 200a and the upper surface portion of the annular body 200b for reinforcement are successively and locally melted as centering the neighborhood of the irradiated portion F1 of the outer peripheral portion-annular body for reinforcement boundary position along the circumferential direction thereof.

In the first embodiment, under such local heating, the heating temperature of the outer peripheral portion 210 of the diaphragm 200a gradually decreases from the lower surface (a surface on the side of the annular body 200b for reinforcement) of the outer peripheral portion 210 of the diaphragm 200a to the opposite surface under heat absorption of the pressing plate Q1. With this, in the annular body 200b for reinforcement, the heating temperature gradually decreases from the side of the outer peripheral portion 210 of the diaphragm 200a toward the opposite direction to the upper surface of the outer peripheral portion 210. Thus, the annular body 200b for reinforcement and the outer peripheral portion 210 of the diaphragm 200a are melted together in the predetermined area described above.

While maintaining such emission by the laser beam, the laser device L rotates so as to successively focus the laser beam along the circumference area (the melting area) including the neighborhood of the irradiated portion F1 of the outer peripheral portion-annular body for reinforcement boundary portion.

Accordingly, the upper surface portion of the annular body 200b for reinforcement and the outer peripheral portion 210 of the diaphragm 200a are heated by the laser beam to be uniformly melted and welded over the predetermined area centering the circumferential area including the neighborhood of the irradiated portion F1 of the outer peripheral portion-annular body for reinforcement boundary portion. The laser device L then stops emitting the laser beam. Accordingly, the upper surface portion of the annular body 200b for reinforcement and the outer peripheral portion 210 of the diaphragm 200a are naturally cooled and hardened. Thus, the annular body 200b for reinforcement and the diaphragm 200a are welded to each other while maintaining their original shapes.

Subsequently, at a removal process S6a of an annular pressing plate in FIG. 4, the annular pressing plate Q1 is removed from the outer peripheral portion 210 of the diaphragm 200a. It is possible to form an integrated joining structure obtained by laser welding the annular body 200b for reinforcement to the outer peripheral portion 210 of the diaphragm 200a in a state where the annular body 200b for reinforcement is welded and hardened to the outer peripheral portion 210 of the diaphragm 200a. Accordingly, sealing between the annular body 200b for reinforcement and the outer peripheral portion 210 of the diaphragm 200a can be preferably ensured.

As described above, the diaphragm member 200 is integrally formed by the diaphragm 200a, the annular body 200b for reinforcement, and the valve body 200c. In the diaphragm member 200 having the structure described above, the diaphragm 200a is formed as a separate part from the piston shaft 320 of the driving mechanism 300. It is needless to mention that the diaphragm member 200 enables easy assembly of components or parts such as the partition wall 120 and the like between the driving mechanism 300 and the diaphragm 200a in the housing 100. In addition, it is possible to achieve convenience of using the diaphragm member 200 before laser welding in diaphragm valves with various specifications.

After the diaphragm member 200 is formed as described above, the diaphragm member 200 is fitted at the diaphragm 200a into the outer annular wall portion 111b of the upper wall portion 111 of the bottom wall 110 prepared in advance, while holding the valve body 200c under the diaphragm 200a and then sits on the inner annular wall portion 111a through the annular body 200b for reinforcement.

In this instance, the annular body 200b for reinforcement is laser welded to the outer peripheral portion of the diaphragm 200a. Consequently, by sitting the annular body 200b for reinforcement on the inner annular wall portion 111a inside of the outer annular wall portion 111b of the upper wall portion 111 of the bottom wall 110, the diaphragm 200a can sit on the inner annular wall portion 111a through the annular body 200b for reinforcement.

In other words, even if the diaphragm 200a is thin and difficult to be handled, the annular body 200b for reinforcement exerts reinforcement function to the diaphragm 200a on a basis of the joining structure formed by laser welding between the outer peripheral portion 210 of the diaphragm 200a and the annular body 200b for reinforcement as described above. Thus, the diaphragm 200a is easily fitted into the outer wall portion 111b of the upper wall portion 111 to be capable of successfully sitting on the inner annular wall portion 111a together with the annular body 200b for reinforcement.

Next, as illustrated in FIG. 1, the partition wall 120 is fitted at the partition wall main body 120a into the outer annular wall portion 111b so as to oppose the diaphragm 200a through the diaphragm 200a, and is assembled at the annular flange 120b to the bottom wall 110 so as to sit on the outer annular wall portion 111b. Accordingly, the outer peripheral portion 210 of the diaphragm 200a is sandwiched between the inner annular wall portion 111a and the outer peripheral portion of the partition wall main body 120a under the laser welding of the central hole portion 240 of the diaphragm 200a with the open end portion 262 of the valve body 200c and the laser welding of the outer peripheral portion 210 of the diaphragm 200a with the annular body 200b for reinforcement. As a result, sealing of the interior of the liquid chamber Ra can be preferably ensured.

Subsequently, the piston shaft 320 is slidably fitted into the through-hole portion 122 of the partition wall 120 through the O-ring 321, thereby to be coaxially fastened to the female screw hole portion 261 of the valve body 200c through the central hole portion 240 of the diaphragm 200a. In this instance, the central hole portion 240 of the diaphragm 200a is joined by laser welding to the extending end portion 262 of the valve body 200c, as previously described. Herein, the diaphragm 200a is joined at its central portion with the valve body 200c by laser welding, although the above-mentioned film-like diaphragm 200a is very thin. Thus, even if the diaphragm 200a does not include at its central portion a coupling portion required to couple to the piston shaft 320, the diaphragm 200a can be easily coupled to the piston shaft 320 by fastening the shaft-shaped male screw portion 320b of the piston shaft 320 to the female screw hole 261 of the neck portion 260 of the valve body 200c through the central hole portion 240 of the diaphragm 200a.

Thereafter, in a state where the coil spring 330 prepared in advance is fitted into the annular trench portion 141 of the upper housing member 100b, the piston 310 is accommodated in the hollow portion 131 of the peripheral wall 130 through the O-ring 311. Subsequently, the upper housing member 100b is fitted at its distal end opening portion into the partition wall main body 120a, thereby to sit on the annular flange 120b. In this way, manufacturing and assembling of the diaphragm valve is completed.

In the first embodiment constructed described above, when manufacturing a semiconductor element by a semiconductor manufacturing apparatus, it is assumed that the air-operated diaphragm valve is in a closed state.

In this instance, in the air-operated diaphragm valve, the piston 310 is slid downward within the upper housing member 100b on a basis of urging force of the coil spring 330.

Thus, the piston shaft 320 causes the valve body 200c to sit on the annular valve seat 111c while displacing the diaphragm 200a in a curved shape. When a compressed airflow is supplied into the lower chamber 131b from the above mentioned compressed airflow supply source through the opening portion 134 and the communicating passage portion 133 of the upper housing member 100b in such a closed state of the diaphragm valve, the piston 310 is slid together with the piston shaft 320 by the air pressure of the compressed airflow within the lower chamber 131b upward in the hollow portion 131 of the upper housing member 100b against the urging force of the coil spring 330.

Accordingly, the valve body 200c interlocks with the piston shaft 320 while displacing the diaphragm 200a in a curved shape and is separated from the annular valve seat 111c. The diaphragm valve is thus opened.

When a liquid is supplied from the liquid supply source described above into the upstream portion of the above-mentioned piping system in such a state, the liquid flows into the liquid chamber Ra through the inflow pipe 110b, the communicating passage portion 112, and the annular valve seat 111c. The liquid flowing into the liquid chamber Ra in such away flows into the downstream portion of the piping system through the communicating passage portion 113 and the outflow pipe 110c.

In such a liquid flowing process, the liquid flowing into the liquid chamber Ra as described above flows into the outflow pipe 110c from the liquid chamber Ra through the communicating passage portion 113, while displacing the diaphragm 200a in a curved shape to the air chamber Rb or the liquid chamber Ra according to a variation of liquid pressure thereof.

Herein, the diaphragm 200a is a film-shaped diaphragm formed by extrusion molding of PFA, as described above. The diaphragm 200a thus has good smooth surfaces at both surfaces thereof.

Consequently, even if the diaphragm valve 200 is in operation, not only does it not occur the situation that particles caused by cutting marks are peeled from the diaphragm 200a by contact of the diaphragm 200a with a liquid to be mixed into the liquid, but also may be minimized even mixing of very small particles with a size of several nanometers into the liquid. This is similarly established even if the valve body 200c sits on the annular valve seat 111c or separates from the annular valve seat 111c.

From the above descriptions, the liquid flowing in the liquid chamber Ra is maintained substantially clean by minimizing even mixture of very small particles with a size of several nanometers, as previously described and flow into the downstream portion of the piping system through the communicating passage portion 113 and the outflow pipe 110c.

Thus, in the production of a semiconductor element, even if the liquid flowing into the downstream portion of the piping system flows along a surface of a semiconductor wafer having a wiring pitch of, for example, 10 (nm) or less, it does not lead to abnormalities such as a short-circuit or other between wires by adhering of particles with a size of several nanometers to the surface of the semiconductor wafer. As a result, the semiconductor element manufactured can be preferably maintained in quality.

Also, the film-shaped diaphragm 200a is formed by extrusion molding of PFA, as described above. Thus, the film-shaped diaphragm 200a can be formed as a diaphragm which can minimize even generation of particles with a size of several nanometers and is excellent in flexibility and can maintain a long life. Consequently, even if a diaphragm valve having such a diaphragm 200a is adopted to the semiconductor manufacturing apparatus, the diaphragm valve can maintain good functions for a long time as a diaphragm valve adopted to the semiconductor manufacturing apparatus, from the fact that the diaphragm 200a successfully maintains bending operations for a long time.

Second Embodiment

Figure 6:
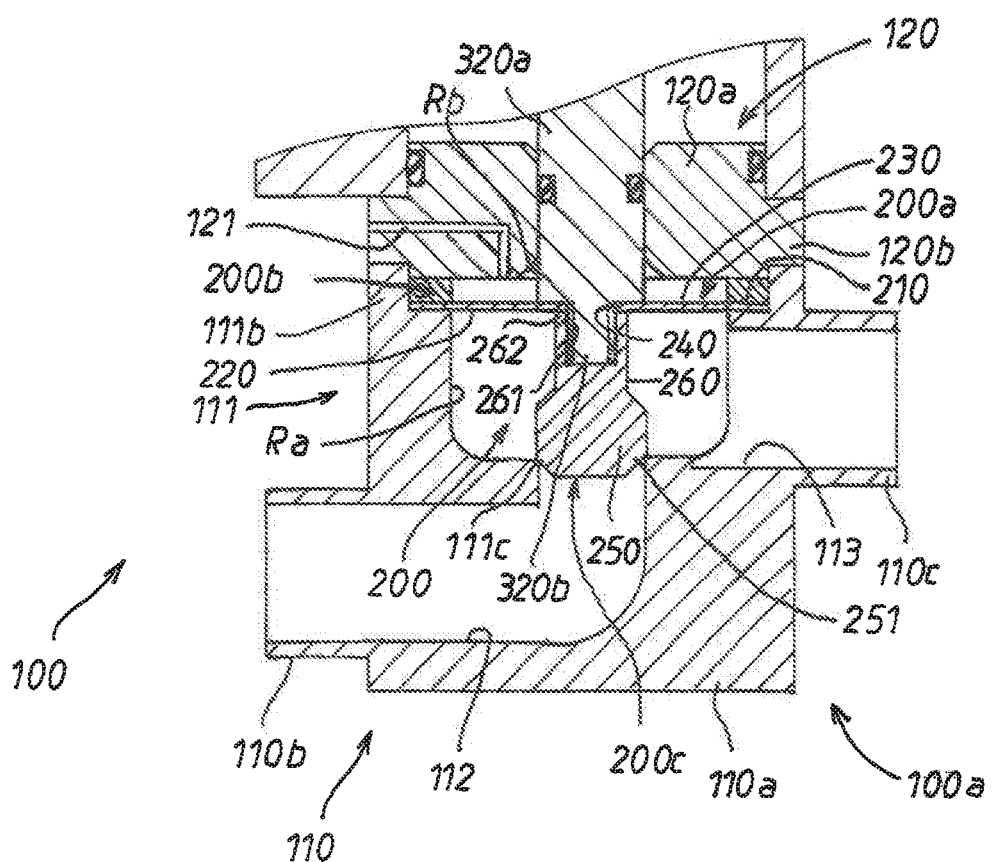
FIG. 6 indicates a partial longitudinal sectional view of a main portion of a second embodiment of a diaphragm valve to which the present invention is applied.

FIG. 6 illustrates a main portion of a second embodiment of the present invention. According to the second embodiment, in an air-operated diaphragm valve, a diaphragm member formed by laser welding an annular body 200b for reinforcement to an outer peripheral portion 210 of a diaphragm 200a from its upper surface side is adopted instead of the diaphragm member 200 described in the first embodiment. In addition, the diaphragm member according to the second embodiment is also denoted by the reference numeral 200 as in the first embodiment.

The diaphragm member 200 is constructed by the diaphragm 200a, the annular body 200b for reinforcement, and a valve body 200c as in the first embodiment.

Also in the second embodiment, the valve body 200c is laser welded at an open end portion 262 of a neck portion 260 to a central hole portion 240 of the diaphragm 200a as in the first embodiment. Unlike the first embodiment, the annular body 200b for reinforcement is laser welded to the outer peripheral portion 210 of the diaphragm 200a from a side of an upper surface 230.

Herein, the outer peripheral portion 210 of the diaphragm 200a laser welded to the valve body 200c as in the first embodiment is laser welded to the annular body 200b for reinforcement as follows.

Figure 7:
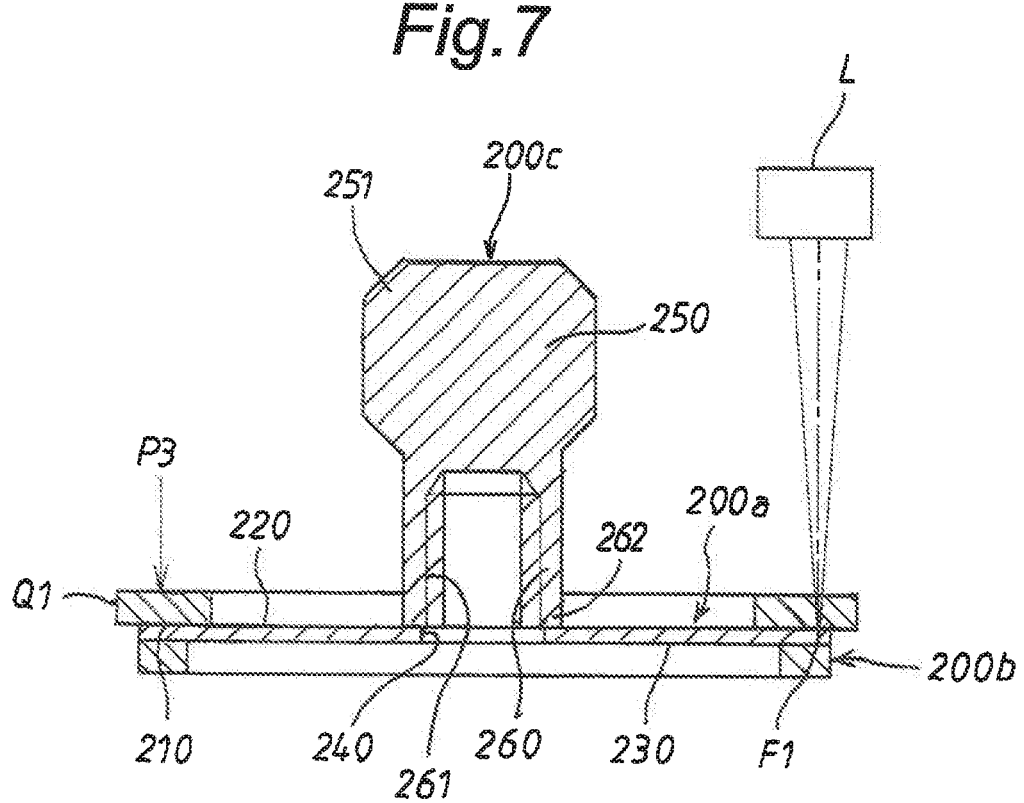
FIG. 7 indicates a sectional view for explaining laser welding of an annular body for reinforcement to an outer peripheral portion of the diaphragm in the second embodiment.

At a holding process S1a of an annular body for reinforcement illustrated in FIG. 4, the annular body 200b for reinforcement is held so as to be located horizontally at its upper surface (see FIG. 7). Then, at the next placing process S2a of a diaphragm, the diaphragm 200a is placed at its upper surface 230 on the annular body 200b for reinforcement from its upper side, unlike the first embodiment. In this instance, the outer peripheral portion 210 of the diaphragm 200a is placed so as to correspond coaxially to the annular body 200b for reinforcement.

Subsequently, processes at a placing process S3a of an annular pressing plate, an irradiation process S5a of the laser beam, and a removal process S6a of the annular pressing plate are performed as in the first embodiment. Accordingly, an integrated joining structure obtained by laser welding between the annular body 200b for reinforcement and the outer peripheral portion of the diaphragm 200a is formed in a state where the annular body 200b for reinforcement is welded and hardened to the outer peripheral portion 210 of the diaphragm 200a.

As a result, regarding laser welding of the annular body 200b for reinforcement to the outer peripheral portion of the diaphragm 200a, operations and effects similar to those of the first embodiment are achieved also in the second embodiment while ensuring the convenience of the diaphragm 200a.

After the diaphragm member 200 according to the second embodiment is formed, as described above, the diaphragm member 200 is assembled to a lower housing member 100a as follows.

Herein, in the bottom wall main body 110a of the lower housing member 100a described in the first embodiment, an outer annular wall portion 111b of an upper wall portion 111 is formed to project more higher than the inner annular wall portion 111a, unlike the first embodiment.

In the diaphragm member 200 having the structure described above according to the second embodiment, the diaphragm 200a is fitted into the outer wall portion 111b with the annular body 200b for reinforcement located at the upper side thereof to sit on the inner annular wall portion 111a at the outer peripheral portion 210. Accordingly, the annular body 200b for reinforcement is fitted from the upper side of the diaphragm 200a into the outer wall portion 111b which projects high as previously described.

Subsequently, the partition wall 120 is, as illustrated in FIG. 6, fitted into the outer annular wall portion 111b at the partition wall main body 120a so as to oppose the diaphragm 200a at an inner end opening portion of the communicating path or passage 121 through the annular body 200b for reinforcement interposed, thereby to sit on the annular body 200b for reinforcement. And also the partition wall 120 is assembled to the bottom wall 110 so as to sit on the outer annular wall portion 111b at the annular flange 120b. In this instance, the valve body 200c opposes the annular valve seat 111c so as to be capable of sitting on the annular valve seat 111c in the liquid chamber Ra.

Even if the diaphragm member 200 has construction in which the annular body 200b for reinforcement is laser welded to the outer peripheral portion 210 of the diaphragm 200a from its upper surface side, unlike the first embodiment, the valve body 200c is formed as separate parts from the piston shaft 320 of the driving mechanism 300. Consequently, also in the second embodiment, according to the diaphragm member 200, assembly of components such as the partition wall 120 and the like between the driving mechanism 300 and the diaphragm 200a in the housing 100 can be easily performed, and conveniences that the diaphragm member 200 can be shared in diaphragm valves with various specifications can be also ensured.

Then, the piston shaft 320 is coaxially fastened into the female screw hole 261 of the valve body 200c while being fitted at the shaft-shaped male screw portion 320b into the through-hole 122 of the partition wall 120 through the O-ring 321. Thus, even if the diaphragm 200a does not include a coupling portion required to couple at its central portion to the piston shaft 320, as described in the first embodiment, the coupling between the diaphragm 200a and the piston shaft 320 can be easily performed by fastening the shaft-shaped male screw portion 320b of the piston shaft 320 into the female screw hole portion 261 of the neck portion 260 of the valve body 200c through the central hole portion 240 of the diaphragm 200a. Other constructions and operation and effects are similar to those of the first embodiment.

Third Embodiment

Figure 8:
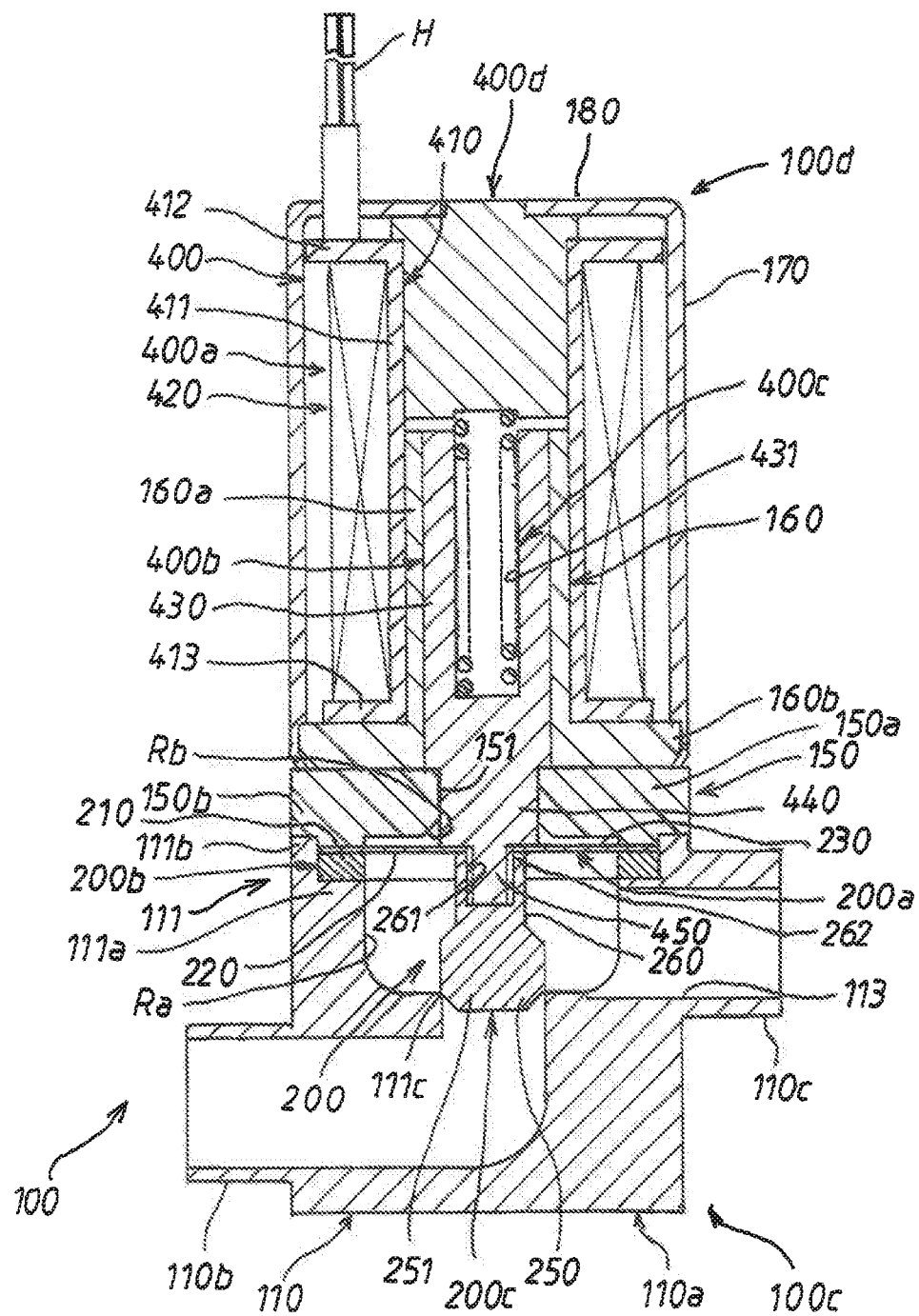
FIG. 8 indicates a longitudinal sectional view of a third embodiment of a diaphragm valve to which the present invention is applied.

FIG. 8 illustrates a third embodiment of a diaphragm valve to which the present invention is applied. In the third embodiment, as a diaphragm valve, an electromagnetically operated diaphragm valve is adopted, differing from the air-operated diaphragm valve described in the first embodiment.

As illustrated in FIG. 8, the electromagnetically operated diaphragm valve includes a cylindrical housing, the diaphragm member 200 described in the first embodiment, and an electromagnetically operated driving mechanism 400 and is constructed as a solenoid valve of a normally closed type. In addition, in the third embodiment, the cylindrical housing is also denoted by the reference numeral 100 as in the first embodiment. Hereinafter, the electromagnetically operated driving mechanism 400 will be also referred to as the driving mechanism 400.

The cylindrical housing 100 according to the third embodiment is constructed by a lower housing member 100c and an upper housing member 100d. The lower housing member 100c is constructed by the bottom wall 110 described in the first embodiment and a partition wall 150, as illustrated in FIG. 8.

As illustrated in FIG. 8, the partition wall 150 includes a partition wall main body 150a and an annular flange portion 150b. The partition wall main body 150a is fitted at its lower wall portion into the outer annular wall portion 111b of the upper wall portion 111 in the bottom wall main body 110a to sit on the inner annular wall portion 111a through the diaphragm 200a of the diaphragm member 200 and the annular body 200b for reinforcement.

The annular flange portion 150b is formed to annularly project outward from a portion excluding a lower portion of an outer peripheral portion of the partition wall main body 150a along a radial direction. The annular flange portion 150b sits coaxially on the outer annular wall portion 111b of the upper wall portion 111 of the bottom wall main body 110a. In this way, the partition wall 150 is assembled coaxially to the bottom wall main body 110a from above through the diaphragm 200a and the annular body 200b for reinforcement.

The upper housing member 100d is formed in a rectangular shape as seen in transverse sectional view, similarly to the upper housing member 100b described in the first embodiment. The upper housing member 100d is formed with a peripheral wall 170 and an upper wall 180 integrally by a magnetic material (for example, iron).

The peripheral wall 170 is extended downward from the upper wall 180 in the form of a cylindrical shape. The peripheral wall 170 is coaxially assembled at its extending open end portion on the partition wall 150 together with an annular flange portion 160b of a guide member 160 (to be described later).

The guide member 160 acts a role for guiding a plunger 400b (to be described later) in an axial direction, and is formed so as to integrally include a cylindrical portion 160a and the annular flange 160b. The annular flange 160b is extended from a lower end portion of the cylindrical portion 160a in a radial direction to be parallel with the upper wall 180 so that it positions coaxially the cylindrical portion 160a in the peripheral wall 170. The annular flange portion 160b is fixed at its outer peripheral portion in an extending open end portion of the peripheral wall 170 by caulking. In addition, the cylindrical portion 160a coaxially extends from an inner peripheral portion of the annular flange portion 160b into the peripheral wall 170.

The diaphragm member 200 has a construction similar to the diaphragm member described in the first embodiment. In the diaphragm member 200, the diaphragm 200a is fitted into the inner circumference of the outer annular wall portion 111b of the upper wall portion 111 of the bottom wall main body 110a together with the annular body 200b for reinforcement.

Accordingly, the diaphragm 200a sits on the inner annular wall portion 111a of the upper wall portion 111 through the annular body 200b for reinforcement. The diaphragm 200a divides at the inner peripheral side of the inner annular wall portion 111a a space from the space of the cylindrical shape with the longitudinal cross section described in the first embodiment to the partition wall main body 150a into the liquid chamber Ra and the air chamber Rb described in the first embodiment.

The valve body 200c opposes the annular valve seat 111c so as to be capable of sitting on the annular valve seat 111c in the fluid chamber Ra. In addition, the air chamber Rb described above may be opened at its interior portion to outside through the partition wall 150. Alternatively, the air chamber Rb may be communicated with an interior portion of the upper housing member 100d through a space between the through-hole portion 151 of the partition wall main body 150a and a cylinder portion 440 (to be described later) of the plunger 400b.

The driving mechanism 400 includes a coil member 400a, the plunger 400b, a coil spring 400c, and a cylindrical stopper member 400d. The coil member 400a is coaxially fitted into the peripheral wall 170 of the upper housing member 100d. The coil member 400a includes a cylindrical bobbin 410 and a solenoid 420. The cylindrical bobbin 410 is constructed by a cylinder portion 411 and upper and lower annular wall portions 412 and 413 extending outward from axial both end portions of the cylinder portion 411 toward a radial direction. The solenoid 420 is wound around the cylinder portion 411 between the upper and lower annular wall portions 412 and 413.

The coil member 400a constructed in this way is fitted into the cylindrical portion 160a of the guide member 160 and the cylindrical stopper member 400d at the cylinder portion 411 of the cylindrical bobbin 410, thereby to be accommodated in the peripheral wall 170. In addition, the solenoid 420 is connected at its upper end terminal to a feeder line H of a power supply (not illustrated) through the upper annular wall portion 412 of the cylindrical bobbin 410.

When the solenoid 420 receives electricity from the power supply through the feeder line H to be excited in the coil member 400a constructed in such way, the solenoid 420 generates magnetic attraction force. When the solenoid 420 is disconnected from the power supply, it is demagnetized and stops to generate the magnetic attraction force.

The plunger 400b is made of a magnetic material and constructed by a plunger main body 430, a cylinder portion 440, and a shaft-shaped male screw portion 450. The plunger main body 430 is formed in a cylindrical shape, and coaxially fitted slidably into the cylindrical portion 160a of the guide member 160. The cylinder portion 440 has an outer diameter smaller than that of the plunger main body 430, and is coaxially extended downward from a lower end portion of the plunger main body 430. The shaft-shaped male screw portion 450 has an outer diameter smaller than that of the cylinder portion 440, and is coaxially extended downward from an extending end portion of the cylinder portion 440. Herein, the shaft-shaped male screw portion 450 is fastened into a female screw hole portion 261 of the valve body 200c through a central hole portion 240 of the diaphragm 200a.

The coil spring 400c is inserted into an insertion hole portion 431 which is coaxially formed in the plunger main body 430 of the plunger 400b from its upper portion. The stopper member 400d is coaxially fixed to the central portion of the upper wall 180 in the upper housing member 100d to extend toward the cylindrical portion 160a of the guide member 160, the plunger main body 430 of the plunger 400b, and the coil spring 400c.

Thus, the coil spring 400c is sandwiched between an extending end central portion of the stopper member 400d and a bottom of the insertion hole portion 431 of the plunger main body 430 to urge the plunger 400b toward the valve body 200c.

Then, when the solenoid 420 generates magnetic attraction force in the driving mechanism 400, the plunger 400b is attracted toward the stopper member 400d by the magnetic attraction force against the urging force of the coil spring 400c to slide toward the extending end portion of the stopper member 400d along the cylindrical portion 160a of the guide member 160. Accordingly, the valve body 200c is separated from the annular valve seat 111c by the plunger 400b with the shaft-shaped male screw portion 450, and the diaphragm 200a is displaced in a curved shape.

On the other hand, when the solenoid 420 stops generating the magnetic attraction force, the plunger 400b is slid toward the partition wall 150 by the coil spring 400c under its urging force. Accordingly, the plunger 400b allows the valve body 200c to sit on the annular valve seat 111c and causes the diaphragm 200a to displace in a curved manner by means of the shaft-shaped male screw portion 450. Other constructions are similar to those of the above-mentioned first embodiment.

In the third embodiment constructed in such a way, the electromagnetically operated diaphragm valve is adopted as the diaphragm valve instead of the air operated diaphragm valve described in the first embodiment.

With this construction, the electromagnetically operated diaphragm valve according to the third embodiment includes the upper housing member 100d and the electromagnetically operated driving mechanism 400 differing from the upper housing member 100b and the air operated driving mechanism 300 of the air operated diaphragm valve described in the first embodiment. Thus, although the shaft-shaped male screw portion 450 of the plunger 400b is fastened to the female screw hole portion 261 of the valve body 200c through the central hole portion 240 of the diaphragm 200a, the diaphragm member 200 and the lower housing member 100a are substantially similar to those of the first embodiment except that the partition wall has a slightly different configuration.

Consequently, also in the third embodiment, the central hole portion 240 of the diaphragm 200a is laser welded to the valve body 200c as described above. As a result, the plunger 400b, the diaphragm 200a, and the valve body 200c can be easily coupled to each other by fastening the shaft-shaped male screw portion 450 of the plunger 400b to the female screw hole portion 261 of the valve body 200c through the central hole portion 240 of the diaphragm 200a and the annular body 200b for reinforcement.

In case the electromagnetically operated diaphragm valve is disposed in the piping system of the semiconductor manufacturing apparatus, instead of the air operated diaphragm valve described in the first embodiment, operations of the diaphragm 200a and the valve body 200c of the diaphragm member 200 are performed by operation of the plunger 400b under the magnetic attraction force in the third embodiment. However, the opening and closing operations of the diaphragm valve and the construction of the diaphragm member 200 are similar to those of the first embodiment, and thus similar operations and effects to those of the first embodiment can be achieved.

Fourth Embodiment

Figure 9:
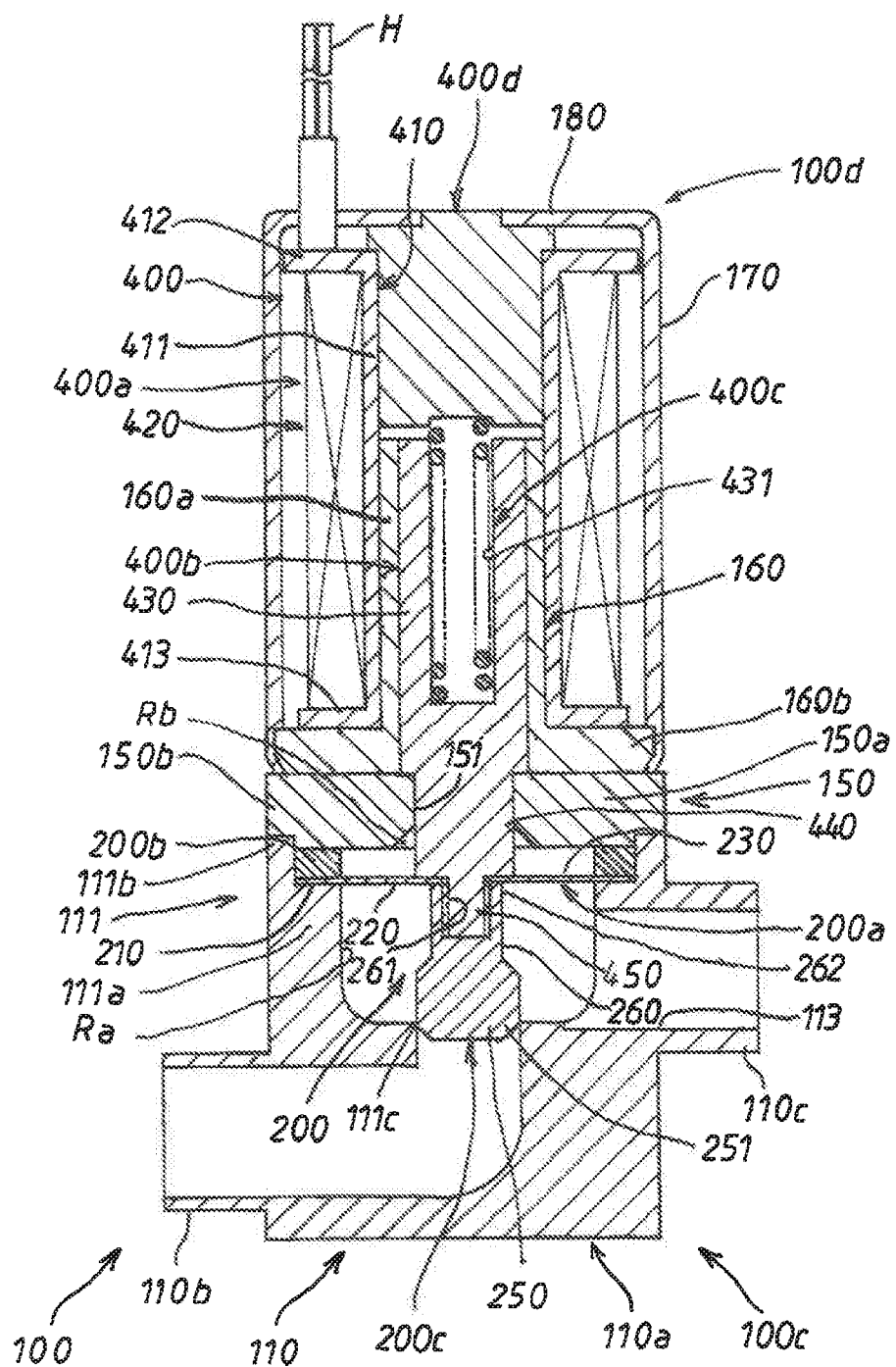
FIG. 9 indicates a longitudinal sectional view of a fourth embodiment of a diaphragm valve to which the present invention is applied.

FIG. 9 illustrates a fourth embodiment of the present invention. In the fourth embodiment, the electromagnetically diaphragm valve includes the diaphragm member 200 (see FIGS. 6 and 7) and the lower housing member 100a described in the second embodiment, and also includes the upper housing member 100d and the electromagnetically operated driving mechanism 400 described in the third embodiment, instead of the upper housing member 100b and the air operated driving mechanism 300 described in the second embodiment.

Herein, the plunger 400b is slidably fitted at the cylinder portion 440 into the through-hole portion 151 of the partition wall 150 through the annular body 200b for reinforcement, and is fastened at its shaft-shaped male screw portion 450 to the female screw hole portion 261 of the valve body 200c through the central hole portion 240 of a diaphragm 200a. In addition, in the fourth embodiment, the cylinder portion 440 has an axial length longer than that of the cylinder portion 440 of the third embodiment, and is thus extended into the annular body 200b for reinforcement. Other constructions are similar to those of the second embodiment.

In the fourth embodiment constructed in this way, an electromagnetically operated diaphragm valve is adopted as a diaphragm valve, instead of the air operated diaphragm valve described in the second embodiment.

With this construction, the electromagnetically operated diaphragm valve according to the fourth embodiment includes the upper housing member 100d and the electromagnetically driving mechanism 400, differing from the upper housing member 100b and the air operated driving mechanism 300 of the air operated diaphragm valve described in the second embodiment and is fastened at the shaft-shaped male screw portion 450 of the plunger 400b to the female screw hole portion 261 of the valve body 200c through the annular body 200b for reinforcement and the central hole portion 240 of the diaphragm 200a. However, the diaphragm member 200 and the lower housing member 100a are substantially similar to those of the second embodiment except that the partition wall has a slightly different construction.

Accordingly, because also in the fourth embodiment, the central hole portion 240 of the diaphragm 200a is laser welded to the valve body 200c as described above, the plunger 400b, the diaphragm 200a, and the valve body 200c can be easily coupled to each other by fastening the shaft-shaped male screw portion 450 of the plunger 400b into the female screw hole portion 261 of the valve body 200c through the annular body 200b for reinforcement and the central hole portion 240 of the diaphragm 200a.

In case the electromagnetically operated diaphragm valve is disposed in the piping system of the semiconductor manufacturing apparatus, instead of the air operated diaphragm valve described in the second embodiment, operations of the diaphragm 200a and the valve body 200c of the diaphragm member 200 are performed by operation of the plunger 400b under the magnetic attraction force in the third embodiment. However, the opening and closing operations of the diaphragm valve and the construction of the diaphragm member 200 are similar to those of the second embodiment, and thus similar operations and effects to those of the second embodiment can be achieved.

Fifth Embodiment

Figure 10:
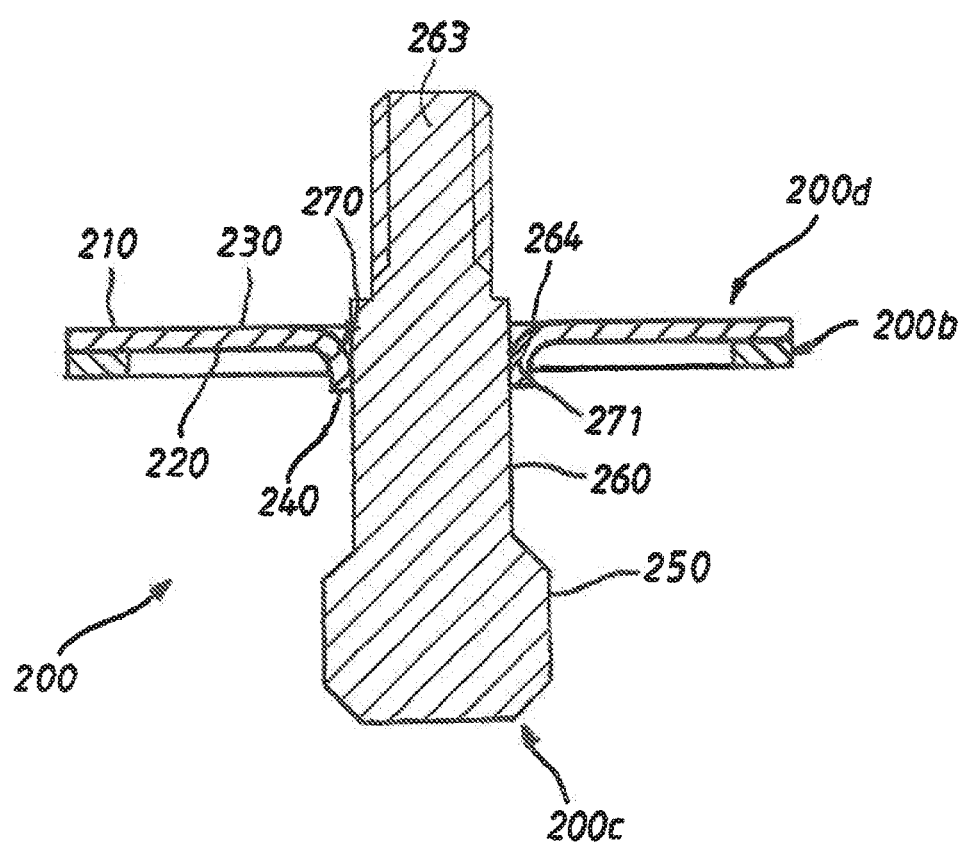
FIG. 10 indicates a longitudinal sectional view of a main portion of a fifth embodiment of a diaphragm valve to which the present invention is applied.

FIG. 10 illustrates a main portion of a diaphragm valve according to a fifth embodiment of the present invention. In the fifth embodiment, a diaphragm member is adopted instead of the diaphragm member 200 described in the first embodiment. The diaphragm member according to the fifth embodiment is also denoted by the reference numeral 200, similarly to the diaphragm member 200 described in the first embodiment.

The diaphragm member 200 according to the fifth embodiment includes a diaphragm 200d and a valve body (also denoted by the reference numeral 200c in the fifth embodiment, like the valve body 200c described in the first embodiment), instead of the diaphragm 200a and the valve body 200c described in the first embodiment, and the annular body 200b for reinforcement described in the first embodiment.

The diaphragm 200d is formed in a film shape by extrusion molding of PFA similarly to the diaphragm 200a described in the first embodiment. The diaphragm 200d thus has performance similar to diaphragm 200a.

The diaphragm 200d includes the outer peripheral portion 210, the lower surface 220, and the upper surface 230 similarly to the diaphragm 200a. The diaphragm 200d has at its central portion the central hole portion 240 described in the first embodiment. Herein, the central portion of the diaphragm 200d is, as illustrated in FIG. 10, extended toward the lower surface 220 in a curved shape so as to have a convex curved shape projecting toward the center of the diaphragm 200d and is thus formed as a central curved portion 270. In other words, the diaphragm 200d is formed at its central portion as the central curved portion 270 having the central hole portion 240 in its center.

The valve body 200c of the fifth embodiment includes a shaft-shaped male screw portion, instead of the female screw hole portion 261 of the valve body 200c described in the first embodiment. The shaft-shaped male screw portion is coaxially extended from an extending end portion of the neck portion 260. In the fifth embodiment, the shaft-shaped male screw portion of the valve body 200c is denoted by the reference numeral 263. In addition, the neck portion 260 of the fifth embodiment is formed to have a longer axis than the neck portion 260 of the first embodiment.

The valve body 200c is coaxially inserted into the central hole portion 240 of the central curved portion 270 of the diaphragm 200d from the shaft-shaped male screw portion 263 to be joined and coupled by laser welding to the central hole portion 240 (an extending open end of the central curved portion 270) of the neck portion 260 at an axial intermediate portion 264 of the neck portion 260 (see FIG. 10).

The annular body 200b for reinforcement is joined by laser welding to the outer peripheral portion 210 of the diaphragm 200d from a side of the lower surface 220, similarly to the first embodiment described above.

In the diaphragm member 200 constructed in this way, the diaphragm 200d is sandwiched at the outer peripheral portion 210 between the bottom wall main body 110a of the bottom wall 110 and the partition wall main body 120a of the partition wall 120 through the annular body 200b for reinforcement, instead of the diaphragm 200a described in the first embodiment and thus partitions the liquid chamber Ra and the air chamber Rb similar to the first embodiment.

Figure 11:
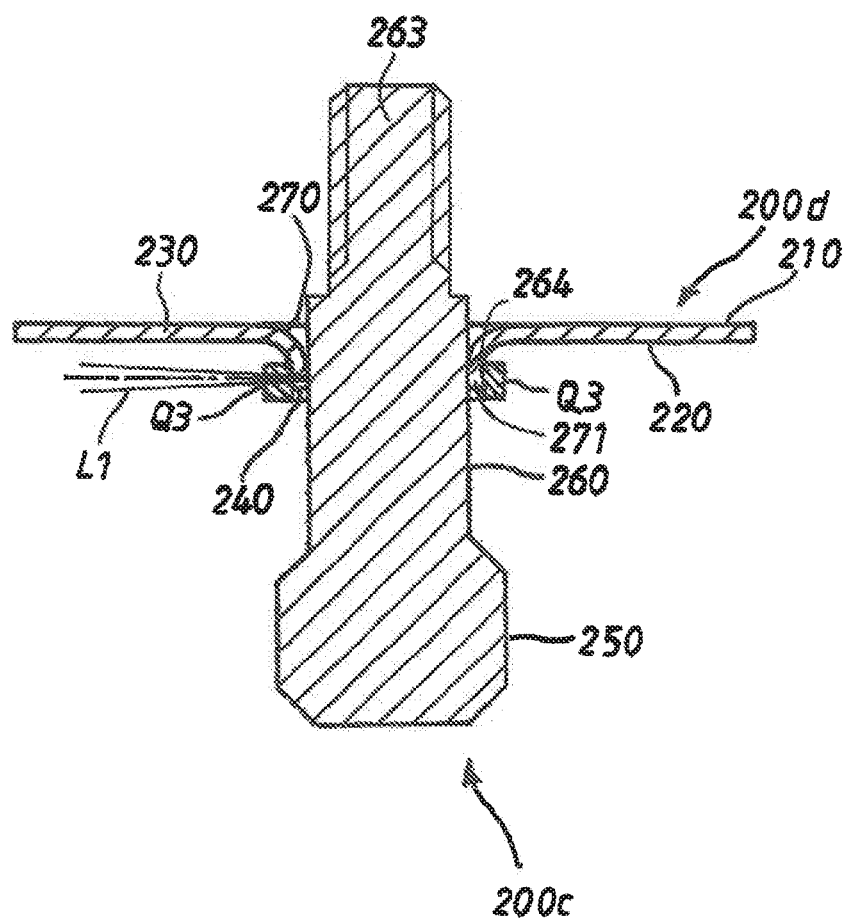
FIG. 11 indicates a sectional view for explaining laser welding of a curved central portion of the diaphragm to a valve body in the fifth embodiment.

Also, laser welding of the valve body 200c to the central curved portion 270 of the diaphragm 200d is performed as follows. After the holding process S1 of the valve body as the same as in the first embodiment, at the placing process S2 of the diaphragm, instead of placing the diaphragm 200a, the central curved portion 270 of the diaphragm 200d abuts at its extending open end portion 271 (the central hole portion 240) against the axial intermediate portion 264 of the neck portion 260 of the valve body 200c which is coaxially inserted from the shaft-shaped male screw portion 263 through the extending open end portion 271, as illustrated in FIG. 11. This means that the extending open end portion 271 of the central curved portion 270 uniformly abuts at its inner peripheral surface against an outer peripheral surface of the axial intermediate portion 264 of the neck portion 260 of the valve body 200c.

Subsequently, at the placing process S3 of the pressing plate, instead of the pressing plate Q described in the first embodiment, a pair of half rings Q3 is placed on the extending open end portion 271 so as to sandwich the extending open end portion 271 of the central curved portion 270 from the left and right sides.

Herein, a pair of the half rings Q3 is formed by a forming material similar to the material for forming the pressing plate Q described in the first embodiment. In addition, a pair of the half rings Q3 forms a ring when being engaged with each other at their opposing end portions. A width of each of the half rings Q3 is set so that each widthwise upper end portion of a pair of the half rings Q3 is placed above the axial intermediate portion 264 of the neck portion 260 and each widthwise lower end portion of a pair of the half rings Q3 is placed below an extending open end portion 217 of the central curved portion 270.

Next, at the pressing process S4 of the pressing plate, a pair of the half rings Q3 is pressed against the central curved portion 270 of the diaphragm 200d from the left and right sides instead of the pressing plate Q so as to be engaged at each opposing end portion. In this instance, a pair of the half rings Q3 is pressed at each inner peripheral surface against the outer peripheral surface of the central curved portion 270 of the diaphragm 200d from its left and right sides with uniform pressing force.

Under such a pressing state, at the irradiation process S5 of the laser beam, a laser beam is irradiated from the laser device L to a pair of the half rings Q3, as indicated by the reference sign L1 in FIG. 11. Herein, in the fifth embodiment, a focal point of the laser beam from the laser device L corresponds to near a portion F2 (hereinafter, also referred to as an irradiated portion F2) on a boundary portion between the central curved portion 270 of the diaphragm 200d and the corresponding axial intermediate portion 264 of the neck portion 260 of the valve body 200c (see FIG. 11). In addition, the laser device L rotates around the axis of a pair of the half rings Q3 while focusing a laser beam along a circumference including the neighborhood of the irradiated portion F2, differing the first embodiment.

When the laser device L rotates then to emit a laser beam toward a pair of the half rings Q3 from their left and right sides, the laser beam is transmitted through a pair of the half rings Q3 and the central curved portion 270 of the diaphragm 200d in a thickness direction, as illustrated in FIG. 11, and focuses near the irradiated portion F2 displacing successively in a circumferential direction.

Accordingly, a portion including the outer peripheral surface portion of the axial intermediate portion 264 of the neck portion 260 of the valve body 200c and a portion including the inner peripheral surface portion of the central curved portion 270 of the diaphragm 200d are heated by a laser beam, centering on a melting area including the neighborhood of the irradiated portion F2, and are uniformly melted and welded. When the laser device L thereafter stops emitting a laser beam, the portion including the outer peripheral portion of the axial intermediate portion 264 of the neck portion 260 of the valve body 200c and the portion including the inner peripheral surface portion of the central curved portion 270 of the diaphragm 200d are naturally cooled and hardened.

Subsequently, at the removal process S6 of the pressing plate illustrated in FIG. 2, a pair of the half rings Q3 are removed from the central curved portion 270 of the diaphragm 200d, instead of the pressing plate Q. A coupling construction obtained by integrated joining on a basis of laser welding between the neck portion 260 of the valve body 200c and the central curved portion 270 of the diaphragm 200d is formed in a state where the neck portion 260 of the valve body 200c and the central curved portion 270 of the diaphragm 200d are welded and hardened with each other.

According to the above construction, the axial intermediate portion 262 of the neck portion 260 of the valve body 200c and the central curved portion 270 of the diaphragm 200d can be successfully joined and coupled by laser welding, while securing the convenience of the diaphragm 200d as an individual component before laser welding.

Accordingly, sealing between the central hole portion of the diaphragm 200d and the axial intermediate portion 264 of the valve body 200c can be ensured preferably under integral construction of the outer peripheral portion 210, the central curved portion 270 and the curved displacement portion between the outer peripheral portion 210 and the central curved portion 270 in the diaphragm 200d.

In addition, in the fifth embodiment, the annular body 200b for reinforcement is joined by laser welding to the outer peripheral portion 210 of the diaphragm 200d from the side of the lower surface 220 of the diaphragm 200d, similarly to the laser welding between the outer peripheral portion 210 of the diaphragm 200a and the annular body 200b for reinforcement described in the first embodiment (see FIG. 10).

As described above, the diaphragm member 200 according to the fifth embodiment is integrally formed by the diaphragm 200d, the annular body 200b for reinforcement, and the valve body 200c. In the diaphragm member 200 constructed described above in the fifth embodiment, the diaphragm 200d is formed as a separate component from the piston shaft 320 of the driving mechanism 300. Thus, according to the diaphragm member 200, it is needless to mention that assembly of components such as the partition wall 120 and the like between the driving mechanism 300 and the diaphragm 200d can be easily performed in the housing 100 of the first embodiment. In addition to this, convenience that the diaphragm member 200 at least before laser welding can be utilized even in diaphragm valves with various specifications can be ensured.

After the diaphragm member 200 of the fifth embodiment is formed as described above, the diaphragm member 200 is assembled between the partition wall 120 and the bottom wall 110, similarly to the diaphragm member 200 described in the first embodiment. In the piston shaft 320 described in the first embodiment, the female screw hole portion is coaxially formed in the shaft main body 320a from its extending end portion side, instead of the shaft-shaped male screw portion 320b. And, the shaft-shaped male screw portion 263 of the valve body 200c is coaxially fastened through the central curved portion 270 of the diaphragm 200d (the central hole portion 240) into the female screw hole portion of the shaft main body 320a which is slidably fitted into the through-hole portion 122 of the partition wall 120, similar to the first embodiment. Thus, Operations and effects similar to those of the first embodiment may be achieved. Other constructions and operations and effects are similar to those of the first embodiment.

In implementing the present invention, the present invention is not limited to the embodiments described above, and the following various modifications are possible.

(1) In implementing the present invention, instead of the diaphragm member 200 of the electromagnetic diaphragm valve described in the third embodiment, the diaphragm member 200 described in the fifth embodiment may be assembled between the bottom wall 110 and the partition wall 150 of the electromagnetic diaphragm valve similarly to the diaphragm member 200 of the third embodiment.

(2) In implementing the present invention, the diaphragm member 200 according to the fifth embodiment may have a structure in which the annular body 200b for reinforcement is joined by laser welding to the outer peripheral portion 210 of the diaphragm 200d from a side of the upper surface 230, unlike the fifth embodiment. Instead of the diaphragm member 200 of the second embodiment, the diaphragm member 200 with such a structure may be assembled between the bottom wall 110 and the partition wall 120 similarly to the diaphragm member 200 of the second embodiment. Alternatively, instead of the diaphragm member 200 of the fourth embodiment, the diaphragm member 200 with such a structure may be assembled between the bottom wall 110 and the partition wall 150 similarly to the diaphragm member 200 of the fourth embodiment.

(3) In implementing the present invention, the diaphragm 200a described in the above embodiments is not limited to a diaphragm formed by extrusion molding PFA in a film shape. The diaphragm 200a may be a diaphragm formed by compression molding PFA in a film shape using a compression molding method.

The compression molding method is a method of filling PFA in a mold and compressing the PFA in a film shape. As in the case of molding the diaphragm 200a by extrusion molding, it is possible to form a film-shaped diaphragm that has chemical resistance, low dissolution property, excellent flexibility, long life, and high smoothness, and also minimizes generation of particles with a size of several nanometers. Operations and effects similar to those of the embodiments described above are achieved.

(4) In implementing the present invention, the driving mechanism 300 described in the first or second embodiment may have a structure in which the coil spring 330 urges the piston 310 in the lower chamber 131b in the opposite direction to the partition wall 120 in FIG. 1 or 6, unlike the first or second embodiment. This means that the diaphragm valve functions as a normally open diaphragm valve.

If the diaphragm valve described in the first or second embodiment operates as a normally open diaphragm valve as described above, operations and effects substantially similar to those of the first or second embodiment are achieved.

(5) In implementing the present invention, the driving mechanism 400 described in the third or fourth embodiment may have a structure in which the coil spring 400c urges the plunger 400b toward the stopper member 400d in FIG. 8 or 9, unlike the third or fourth embodiment. This means that the electromagnetic diaphragm valve functions as a normally open diaphragm valve.

If the electromagnetic diaphragm valve described in the third or fourth embodiment operates as a normally open diaphragm valve as described above, operations and effects substantially similar to those of the third or fourth embodiment are achieved.

(6) In implementing the present invention, the shape of the valve body 200c is not limited to those described in the above embodiments, and any shape that has a function as a valve body may be used.

(7) In implementing the present invention, the annular body 200b for reinforcement may be eliminated if needed. In this case, the outer peripheral portion 210 of the diaphragm 200a is sandwiched between the outer peripheral portion of the partition wall main body 120a of the partition wall 120 and the inner annular wall portion 111a of the bottom wall main body 110a so as to be successively sealed therebetween.

(8) In implementing the present invention, in the piston shaft 320 described in the first embodiment, instead of the shaft-shaped male screw portion 320b, the female screw hole portion may be coaxially formed in the shaft main body 320a to extend from its extending end portion. In the valve body 200c, instead of the female screw hole portion 261, the shaft-shaped male screw portion may coaxially extend from the extending end portion of the neck portion 260. In this case, the valve body 200c passes at its shaft-shaped male screw portion the central hole portion 240 in the diaphragm 200a, and is coaxially fastened to the female screw hole portion in the shaft main body 320a of the piston shaft 320.

(9) In implementing the present invention, in the plunger 400b described in the third or fourth embodiment, instead of the shaft-shaped male screw portion 450, the female screw hole portion may be coaxially formed in the cylinder portion 440 from its extending end portion. In the valve body 200c, instead of the female screw hole portion 261, the shaft-shaped male screw portion may coaxially extend from the extending end portion of the neck portion 260. In this case, the valve body 200c passes at its shaft-shaped male screw portion the central hole portion 240 in the diaphragm 200a, and is coaxially fastened to the female screw hole portion in the cylinder portion 440 of the plunger 400b.

(10) In implementing the present invention, instead of the pressing plate Q, a ring-shaped pressing plate that functions similarly to the pressing plate Q may be used. Normally, a pressing member that has a similar function to the pressing plate Q may be used.

(11) In implementing the present invention, the valve body 200c of the fifth embodiment may have a structure in which a female screw hole portion is formed in the neck portion 260 of the valve body 200c described in the first embodiment from its extending end portion and the shaft-shaped male screw portion 261 is eliminated. In this case, the shaft-shaped male screw portion 320b of the piston shaft 320 described in the first embodiment may pass through the central curved portion 270 (the central hole portion 240) of the diaphragm 200d, and may be coaxially fastened to the female screw hole portion in the valve body 200c.

What is claimed is:

1. A diaphragm member comprising:
a film-like diaphragm of PFA applied to a diaphragm valve configured to flow a liquid, the liquid including at least one of a high-purity chemical liquid and ultrapure water, and
a valve body of fluorine resin,
wherein said diaphragm is formed with a central hole portion at a central portion of the diaphragm, and
said valve body is joined at a base portion of the valve body by laser welding to the central hole portion of said diaphragm.

2. The diaphragm member according to claim 1, wherein the central portion of said diaphragm extends in a curved shape toward one surface of two surfaces of said diaphragm so as to form a convex curved shape toward a center of said diaphragm, the central portion of said diaphragm being formed as a central curved portion including the central hole portion, and
wherein the base portion of said valve body is joined at a portion of the base portion to the central hole portion by laser welding in a state that the base portion is fitted into the central hole portion of the central curved portion from the one surface of said diaphragm.

3. The diaphragm member according to claim 2, further comprising an annular body for reinforcement of fluorine resin being joined by laser welding to the one surface or the other surface of said diaphragm along an outer peripheral portion thereof.

4. The diaphragm member according to claim 2, wherein said diaphragm is formed in a film shape with PFA by extrusion molding or compression molding.

5. The diaphragm member according to claim 4, wherein said diaphragm has a thickness within a range from 0.1 (mm) or more to 0.5 (mm) or less.

6. The diaphragm member according to claim 1, further comprising an annular body for reinforcement of fluorine resin being joined by laser welding to the one surface or the other surface of said diaphragm along an outer peripheral portion thereof.

7. The diaphragm member according to claim 1, wherein said diaphragm is formed in a film shape with PFA by extrusion molding or compression molding.

8. The diaphragm member according to claim 7, wherein said diaphragm has a thickness within a range from 0.1 (mm) or more to 0.5 (mm) or less.

9. A diaphragm valve configured to flow a liquid including at least one of a high-purity chemical and an ultrapure water from an inflow side to an outflow side when opened at a valve portion thereof and blocking the flowing of the liquid when closed at the valve portion thereof, which comprises:
a housing including a cylindrical peripheral wall and both opposing walls formed opposite to each other on said cylindrical peripheral wall so as to close axial opening end portions of said cylindrical peripheral wall,
a partition wall provided on an axial intermediate portion of said cylindrical peripheral wall to divide a hollow portion of said cylindrical peripheral wall between one opposing wall of said both opposing walls and the other opposing wall,
a driving unit assembled in the hollow portion of said cylindrical peripheral wall between the one opposing wall and said partition wall, and
a diaphragm member including a film-like diaphragm of PFA and a valve body of fluorine resin,
wherein in said diaphragm member,
said film-like diaphragm is formed with a central hole portion at a central portion of the diaphragm, said film-like diaphragm being provided so as to form a liquid chamber between the other opposing wall in said housing and an air chamber between said partition wall in said housing, thereby to divide the interior of said housing,
said valve body is joined at a base portion of the valve body by laser welding to the central hole portion of said diaphragm from a lower surface side of said diaphragm, said valve body extending from the central hole portion into the liquid chamber,
said housing is provided with an annular valve seat, an inflow path and an outflow path in the other opposing wall, said annular valve seat opposing said valve body in the liquid chamber to construct the valve portion with said valve body, said inflow path flowing the liquid from the inflow side into the liquid chamber through said annular valve seat, and said outflow path flowing the liquid in the liquid chamber to the outflow side,
said driving unit is provided integrally with a driving shaft coupled with the base portion of said valve body through the central hole portion of said diaphragm from an upper surface side of said diaphragm so as to be axially movable with said valve body of said diaphragm member toward said annular valve seat or in the opposite direction, and
said diaphragm member closes the valve portion when said valve body is seated on said annular valve seat while displacing said diaphragm in a curved shape in conjunction with the axial movement of the driving shaft to the side of the other opposite wall, said diaphragm member opening the valve portion when said valve body is separated from said annular valve seat while displacing said diaphragm in a curved shape in conjunction with the axial movement of the driving shaft to the side of the one opposite wall.

10. The diaphragm valve according to claim 9, wherein the central portion of said diaphragm is extended at the central hole portion of the diaphragm in a curved shape toward the lower surface of said diaphragm so as to become a curved shape projecting convexly to a center of said diaphragm, thereby to be formed as a central curved portion including the central hole portion,
the base portion of said valve body is joined at a portion thereof to the central hole portion of the central curved portion of said diaphragm by laser welding in a state where the base portion is fitted from the lower surface of the diaphragm in the central hole portion of the central curved portion of said diaphragm, and said driving unit is coupled at the driving shaft to the base portion of said valve body from a side of the upper surface of said diaphragm through the central hole portion of the central curved portion of said diaphragm.

11. The diaphragm valve according to claim 10, wherein said driving unit including:

a piston fitted axially slidably into the hollow portion of said cylindrical peripheral wall between the one opposing wall and the partition wall, said piston dividing the hollow portion of said cylindrical peripheral wall so as to form one side chamber and the other side chamber at a side of the one opposing wall and a side of the partition wall respectively, and an urging member urging said piston toward one of the other side chamber and the one side chamber, wherein said driving shaft is a piston shaft extended integrally from said piston through the other chamber to be coupled to the base portion of said valve body through the central hole portion of said diaphragm.

12. The diaphragm valve according to claim 11, wherein said diaphragm member includes an annular body for reinforcement of fluorine resin joined by laser welding to the lower surface or the upper surface of said diaphragm along an outer peripheral portion of said diaphragm.

13. The diaphragm valve according to claim 10, wherein said driving unit including:

a solenoid inserted axially into the hollow portion of said cylindrical peripheral wall between the one opposing wall and the partition wall, a plunger axially movably inserted into said solenoid as said driving shaft to extend toward the partition wall, and an urging member urging said plunger toward the partition wall or the opposite direction, wherein said plunger is coupled at an extending end portion of the plunger to the base portion of said valve body through the central hole portion of said diaphragm from the upper surface side of said diaphragm.

14. The diaphragm valve according to claim 10, wherein said diaphragm member includes an annular body for reinforcement of fluorine resin joined by laser welding to the lower surface or the upper surface of said diaphragm along an outer peripheral portion of said diaphragm.

15. The diaphragm valve according to claim 10, wherein said diaphragm of said diaphragm member is formed in a film shape with PFA by extrusion molding or compression molding.

16. The diaphragm valve according to claim 15, wherein said diaphragm of said diaphragm member has a thickness within a range from 0.1 (mm) or more to 0.5 (mm) or less.

17. The diaphragm valve according to claim 9, wherein said driving unit including:

a piston fitted axially slidably into the hollow portion of said cylindrical peripheral wall between the one opposing wall and the partition wall, said piston dividing the hollow portion of said cylindrical peripheral wall so as to form one side chamber and the other side chamber at a side of the one opposing wall and a side of the partition wall respectively, and an urging member urging said piston toward one of the other side chamber and the one side chamber, wherein said driving shaft is a piston shaft extended integrally from said piston through the other chamber to be coupled to the base portion of said valve body through the central hole portion of said diaphragm.

18. The diaphragm valve according to claim 17, wherein said diaphragm member includes an annular body for reinforcement of fluorine resin joined by laser welding to the lower surface or the upper surface of said diaphragm along an outer peripheral portion of said diaphragm.

19. The diaphragm valve according to claim 9, wherein said diaphragm member includes an annular body for reinforcement of fluorine resin joined by laser welding to the lower surface or the upper surface of said diaphragm along an outer peripheral portion of said diaphragm.

20. The diaphragm valve according to claim 9, wherein said diaphragm of said diaphragm member is formed in a film shape with PFA by extrusion molding or compression molding.

21. The diaphragm valve according to claim 20, wherein said diaphragm of said diaphragm member has a thickness within a range from 0.1 (mm) or more to 0.5 (mm) or less.

\* \* \* \* \*